(12) United States Patent
Wang et al.

(10) Patent No.: US 12,185,316 B2
(45) Date of Patent: Dec. 31, 2024

(54) SIDELINK BANDWIDTH PART SWITCHING

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Fairless Hills, PA (US); Qing Li, Princeton Junction, NJ (US); Hong Cheng, Basking Ridge, NJ (US); Jelena Damnjanovic, Del Mar, CA (US); Peter Gaal, San Diego, CA (US); Juan Montojo, San Diego, CA (US); Yan Zhou, San Diego, CA (US); Jing Sun, San Diego, CA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 17/446,887

(22) Filed: Sep. 3, 2021

(65) Prior Publication Data
US 2023/0070567 A1 Mar. 9, 2023

(51) Int. Cl.
H04W 72/20 (2023.01)

(52) U.S. Cl.
CPC .................. H04W 72/20 (2023.01)

(58) Field of Classification Search
None
See application file for complete search history.

(56) References Cited

U.S. PATENT DOCUMENTS

| | | | |
|---|---|---|---|
| 2020/0288434 A1* | 9/2020 | Choi | H04L 5/0091 |
| 2020/0328864 A1* | 10/2020 | Choi | H04L 5/0098 |
| 2020/0328865 A1* | 10/2020 | Choi | H04W 4/06 |
| 2021/0168814 A1* | 6/2021 | Chen | H04W 72/02 |
| 2021/0235432 A1* | 7/2021 | Zhao | H04W 72/044 |
| 2021/0360590 A1* | 11/2021 | Lee | H04W 72/0453 |
| 2022/0086869 A1* | 3/2022 | Fong | H04W 72/1263 |

* cited by examiner

Primary Examiner — Nguyen H Ngo
(74) Attorney, Agent, or Firm — Harrity & Harrity, LLP

(57) ABSTRACT

Various aspects of the present disclosure generally relate to wireless communication. In some aspects, a first user equipment (UE) may transmit, to a second UE, a first message to indicate a sidelink bandwidth part (BWP) switch, for the first UE, to a first sidelink BWP, wherein the first message includes an indication of the first sidelink BWP and a first sidelink resource pool in the first sidelink BWP. The UE may receive, from the second UE, a second message that confirms the sidelink BWP switch for the first UE. The UE may transmit, to the second UE, a third message to activate the sidelink BWP switch, for the first UE, to the first sidelink BWP, based at least in part on receiving the second message that confirms the sidelink BWP switch. Numerous other aspects are described.

20 Claims, 14 Drawing Sheets

SIDELINK BANDWIDTH PART SWITCHING

FIELD OF THE DISCLOSURE

Aspects of the present disclosure generally relate to wireless communication and to techniques and apparatuses for sidelink bandwidth part (BWP) switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include transmitting, to a second UE, a first message to indicate a sidelink bandwidth part (BWP) switch, for the first UE, to a first sidelink BWP, wherein the first message includes an indication of the first sidelink BWP and a first sidelink resource pool in the first sidelink BWP. The method may include receiving, from the second UE, a second message that confirms the sidelink BWP switch for the first UE. The method may include transmitting, to the second UE, a third message to activate the sidelink BWP switch, for the first UE, to the first sidelink BWP, based at least in part on receiving the second message that confirms the sidelink BWP switch.

Some aspects described herein relate to a method of wireless communication performed by a first UE. The method may include receiving, from a second UE, a first message that indicates a sidelink BWP switch, for the second UE, to a first sidelink BWP, wherein the first message includes an indication of the first sidelink BWP and a first sidelink resource pool in the first sidelink BWP. The method may include transmitting, to the second UE, a second message that confirms the sidelink BWP switch for the second UE. The method may include receiving, from the second UE, a third message that activates the sidelink BWP switch, for the second UE, to the first sidelink BWP.

Some aspects described herein relate to a first UE for wireless communication. The first user equipment may include a memory and one or more processors coupled to the memory. The one or more processors may be configured to transmit, to a second UE, a first message to indicate a sidelink BWP switch, for the first UE, to a first sidelink BWP, wherein the first message includes an indication of the first sidelink BWP and a first sidelink resource pool in the first sidelink BWP. The one or more processors may be configured to receive, from the second UE, a second message that confirms the sidelink BWP switch for the first UE. The one or more processors may be configured to transmit, to the second UE, a third message to activate the sidelink BWP switch, for the first UE, to the first sidelink BWP, based at least in part on receiving the second message that confirms the sidelink BWP switch.

Some aspects described herein relate to a first UE for wireless communication. The first user equipment may include a memory and one or more processors coupled to the memory. The one or more processors may be configured to receive, from a second UE, a first message that indicates a sidelink BWP switch, for the second UE, to a first sidelink BWP, wherein the first message includes an indication of the first sidelink BWP and a first sidelink resource pool in the first sidelink BWP. The one or more processors may be configured to transmit, to the second UE, a second message that confirms the sidelink BWP switch for the second UE. The one or more processors may be configured to receive, from the second UE, a third message that activates the sidelink BWP switch, for the second UE, to the first sidelink BWP.

Some aspects described herein relate to a non-transitory computer-readable medium that stores a set of instructions for wireless communication by a first UE. The set of instructions, when executed by one or more processors of the first UE, may cause the first UE to transmit, to a second UE, a first message to indicate a sidelink BWP switch, for the first UE, to a first sidelink BWP, wherein the first message includes an indication of the first sidelink BWP and a first sidelink resource pool in the first sidelink BWP. The set of instructions, when executed by one or more processors of the first UE, may cause the UE to receive, from the second UE, a second message that confirms the sidelink BWP switch for the first UE. The set of instructions, when executed by one or more processors of the first UE, may cause the first UE to transmit, to the second UE, a third message to activate the sidelink BWP switch, for the first UE, to the first sidelink BWP, based at least in part on receiving the second message that confirms the sidelink BWP switch.

Some aspects described herein relate to a non-transitory computer-readable medium that stores a set of instructions for wireless communication by a first UE. The set of instructions, when executed by one or more processors of the first UE, may cause the first UE to receive, from a second UE, a first message that indicates a sidelink BWP switch, for the second UE, to a first sidelink BWP, wherein the first message includes an indication of the first sidelink BWP and a first sidelink resource pool in the first sidelink BWP. The set of instructions, when executed by one or more processors of the first UE, may cause the first UE to transmit, to the second UE, a second message that confirms the sidelink BWP switch for the second UE. The set of instructions, when executed by one or more processors of the first UE, may cause the first UE to receive, from the second UE, a third message that activates the sidelink BWP switch, for the second UE, to the first sidelink BWP.

Some aspects described herein relate to an apparatus for wireless communication. The apparatus may include means for transmitting, to a UE, a first message to indicate a sidelink BWP switch, for the apparatus, to a first sidelink BWP, wherein the first message includes an indication of the first sidelink BWP and a first sidelink resource pool in the first sidelink BWP. The apparatus may include means for receiving, from the UE, a second message that confirms the sidelink BWP switch for the apparatus. The apparatus may include means for transmitting, to the UE, a third message to activate the sidelink BWP switch, for the apparatus, to the first sidelink BWP, based at least in part on receiving the second message that confirms the sidelink BWP switch.

Some aspects described herein relate to an apparatus for wireless communication. The apparatus may include means for receiving, from a UE, a first message that indicates a sidelink BWP switch, for the UE, to a first sidelink BWP, wherein the first message includes an indication of the first sidelink BWP and a first sidelink resource pool in the first sidelink BWP. The apparatus may include means for transmitting, to the UE, a second message that confirms the sidelink BWP switch for the UE. The apparatus may include means for receiving, from the UE, a third message that activates the sidelink BWP switch, for the UE, to the first sidelink BWP.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
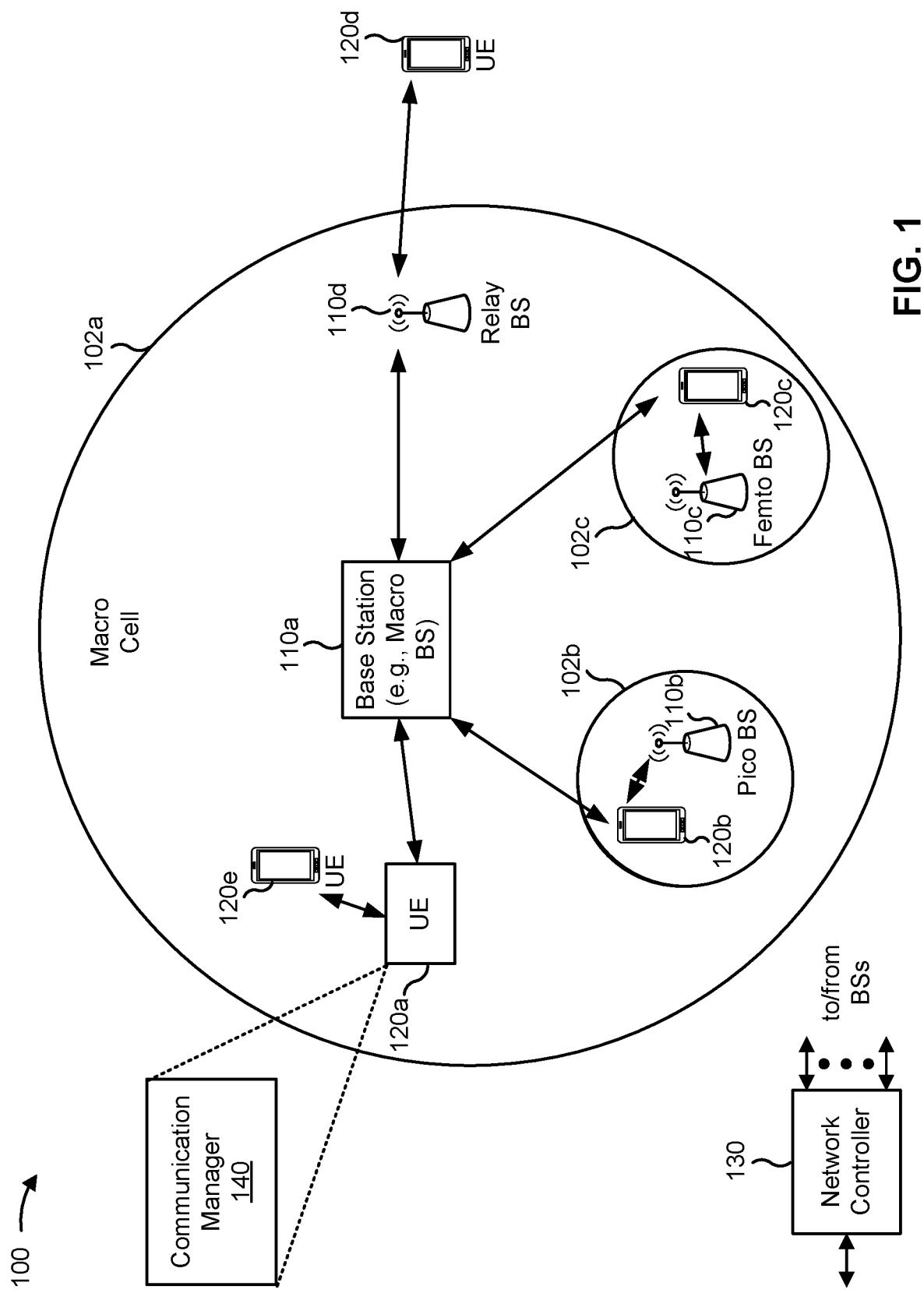
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a second UE, a first message to indicate a sidelink bandwidth part (BWP) switch, for the UE 120, to a first sidelink BWP, wherein the first message includes an indication of the first sidelink BWP and a first sidelink resource pool in the first sidelink BWP; receive, from the second UE, a second message that confirms the sidelink BWP switch for the UE 120; and transmit, to the second UE, a third message to activate the sidelink BWP switch, for the UE 120, to the first sidelink BWP, based at least in part on receiving the second message that confirms the sidelink BWP switch. Additionally, or alternatively, the communication manager 140 may perform one or more other operations described herein.

In some aspects, as described in more detail elsewhere herein, the communication manager 140 may receive, from a second UE, a first message that indicates a sidelink BWP switch, for the second UE, to a first sidelink BWP, wherein the first message includes an indication of the first sidelink BWP and a first sidelink resource pool in the first sidelink BWP; transmit, to the second UE, a second message that confirms the sidelink BWP switch for the second UE; and receive, from the second UE, a third message that activates the sidelink BWP switch, for the second UE, to the first sidelink BWP. Additionally, or alternatively, the communication manager 140 may perform one or more other operations described herein.

As indicated above, FIG. 1 is provided as an example. Other examples may differ from what is described with regard to FIG. 1.

Figure 2:
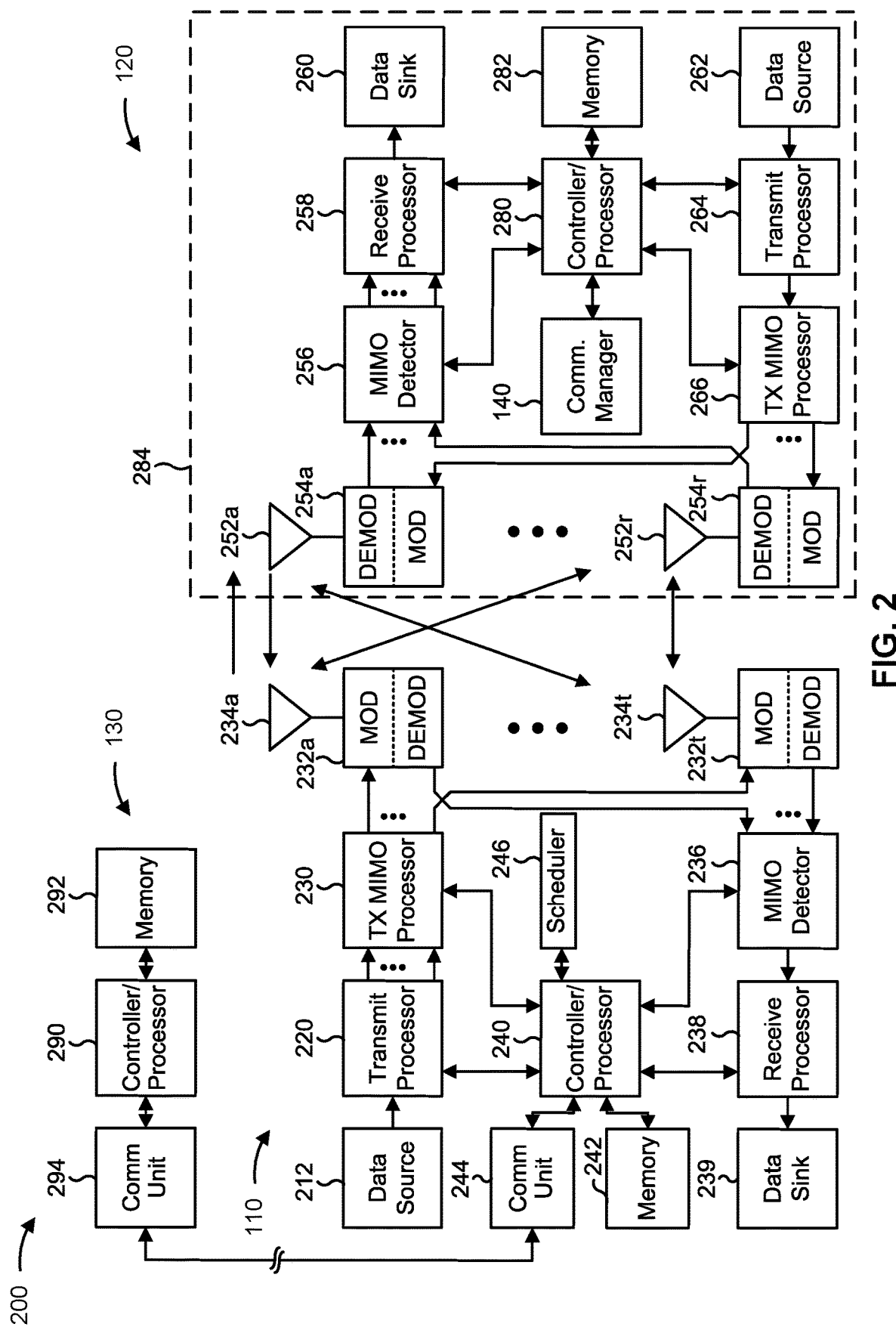
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-14).

The controller/processor 240 of the base station 110, the controller/processor 280 of the UE 120, and/or any other component(s) of FIG. 2 may perform one or more techniques associated with sidelink BWP switching, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE 120 includes means for transmitting, to a second UE, a first message to indicate a sidelink BWP switch, for the UE 120, to a first sidelink BWP, wherein the first message includes an indication of the first sidelink BWP and a first sidelink resource pool in the first sidelink BWP; means for receiving, from the second UE, a second message that confirms the sidelink BWP switch for the UE 120; and/or means for transmitting, to the second UE, a third message to activate the sidelink BWP switch, for the UE 120, to the first sidelink BWP, based at least in part on receiving the second message that confirms the sidelink BWP switch. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving, from a second UE, a first message that indicates a sidelink BWP switch, for the second UE, to a first sidelink BWP, wherein the first message includes an indication of the first sidelink BWP and a first sidelink resource pool in the first sidelink BWP; means for transmitting, to the second UE, a second message that confirms the sidelink BWP switch for the second UE; and/or means for receiving, from the second UE, a third message that activates the sidelink BWP switch, for the second UE, to the first sidelink BWP. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
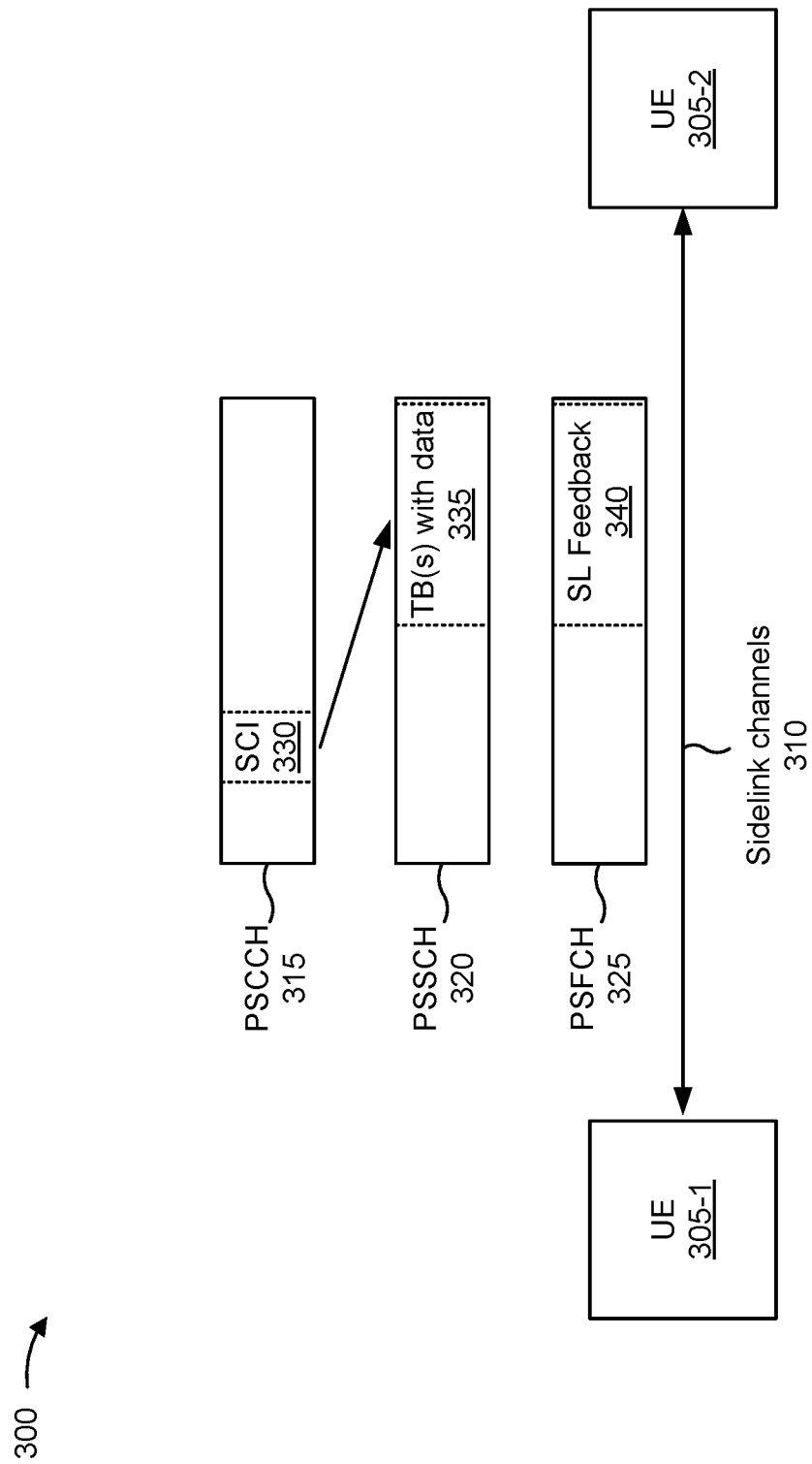
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some examples, the UEs 305 (e.g., UE 305-1 and/or UE 305-2) may correspond to one or more other UEs described elsewhere herein, such as UE 120. In some examples, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330 (e.g., first stage SCI (SCI-1)) which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information).

Although shown on the PSCCH 315 in FIG. 3, in some examples, the SCI 330 may include multiple communications in different stages. For example, SCI (SCI-1) may be transmitted on the PSCCH 315, and second stage SCI (SCI-2) may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process identifier (ID), a new data indicator (NDI), a source identifier, a destination identifier, and/or a channel state information (CSI) report trigger.

In some examples, the one or more sidelink channels 310 may use resource pools. For example, a scheduling assignment (e.g., included in SCI 330) may be transmitted in sub-channels using specific resource blocks (RBs) across time. In some examples, data transmissions (e.g., on the PSSCH 320) associated with a scheduling assignment (e.g., SCI-1) may occupy adjacent RBs in the same slot as the scheduling assignment (e.g., using frequency division multiplexing).

In some examples, a UE 305 may operate using a resource allocation mode (e.g., Mode 1) in which a base station allocates resources for sidelink communications between UEs 305. In some examples, a UE 305 may operate using a resource allocation mode (e.g., Mode 2) in which resource selection and/or scheduling is autonomously performed by the UE 305 (e.g., rather than a base station 110). In some examples, the UE 305 may perform resource selection and/or scheduling by sensing channel availability for transmissions using Mode 2. For example, the UE 305 may measure an RSSI parameter (e.g., a sidelink-RSSI (S-RSSI) parameter) associated with various sidelink channels, may measure an RSRP parameter (e.g., a PSSCH-RSRP and/or PSCCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 carried in the PSCCH 315 (e.g., SCI-1), which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of RBs that the UE 305 can use for a particular set of subframes).

In the resource allocation mode 2 where resource selection and/or scheduling is performed by a UE 305, the UE 305 may generate sidelink grants with reserved resources and may transmit the grants in SCI 330. A sidelink grant may indicate, for example, one or more parameters (e.g., transmission parameters) to be used for an upcoming sidelink transmission, such as one or more subchannels to be used for the upcoming sidelink transmission on the PSSCH 320 (e.g., for TBs 335), one or more slots to be used for the upcoming sidelink transmissions, and/or an MCS to be used for the upcoming sidelink transmission. In some examples, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an aperiodic sidelink transmission.

As indicated above, FIG. 3 is provided as an example. Other examples may differ from what is described with respect to FIG. 3.

Figure 4:
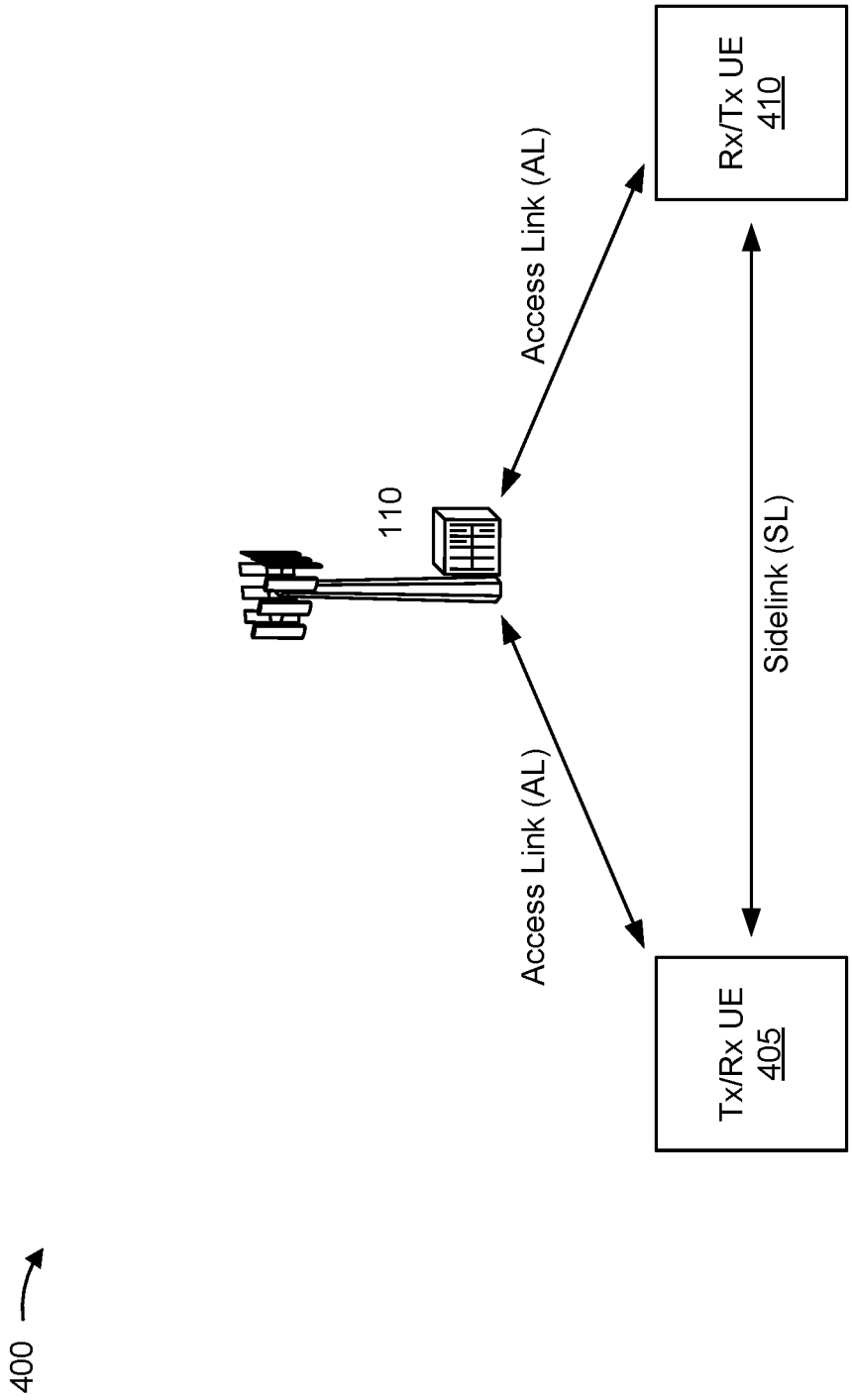
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink resource allocation modes, a base station 110 may communicate with the Tx/Rx UE 405 via a first access link. Additionally, or alternatively, in some sidelink resource allocation modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some examples, a UE 120 may be configured with multiple BWPs per carrier (e.g., component carrier (CC)) for downlink and uplink (e.g., up to four BWPs per carrier for downlink and up to four BWPs per carrier for uplink), but only one BWP per carrier may be active for downlink and one BWP per carrier may be active for uplink at a given time. When a base station 110 configures a BWP for a UE 120, the base station may configure parameters for the BWP including BWP numerology (u), BWP bandwidth size, frequency location (e.g., NR absolute radio-frequency channel number (NR-ARFCN)), and a control resource set (CORESET) for the BWP. In this case, the UE 120 is expected to receive and transmit only within the frequency range configured for the active BWPs with the associated numerologies. In some cases (e.g., in Rel-16 of the 3GPP wireless communication standard), multiple sidelink bandwidth parts on a sidelink carrier (e.g., sidelink CC) may not be supported in NR/5G sidelink communications. That is, in some cases, only one BWP may be configured and activated for all UEs on a sidelink carrier, and only one sidelink carrier may be supported for NR/5G sidelink communications.

In some aspects, to reduce power consumption of UEs and accommodate different UE types, it may be desirable to configure multiple sidelink BWPs in a sidelink CC and dynamically switch the active sidelink BWP for sidelink communications. In this case, one sidelink BWP, of the multiple configured sidelink BWPs, may be active at a given time.

As indicated above, FIG. 4 is provided as an example. Other examples may differ from what is described with respect to FIG. 4.

Figure 5:
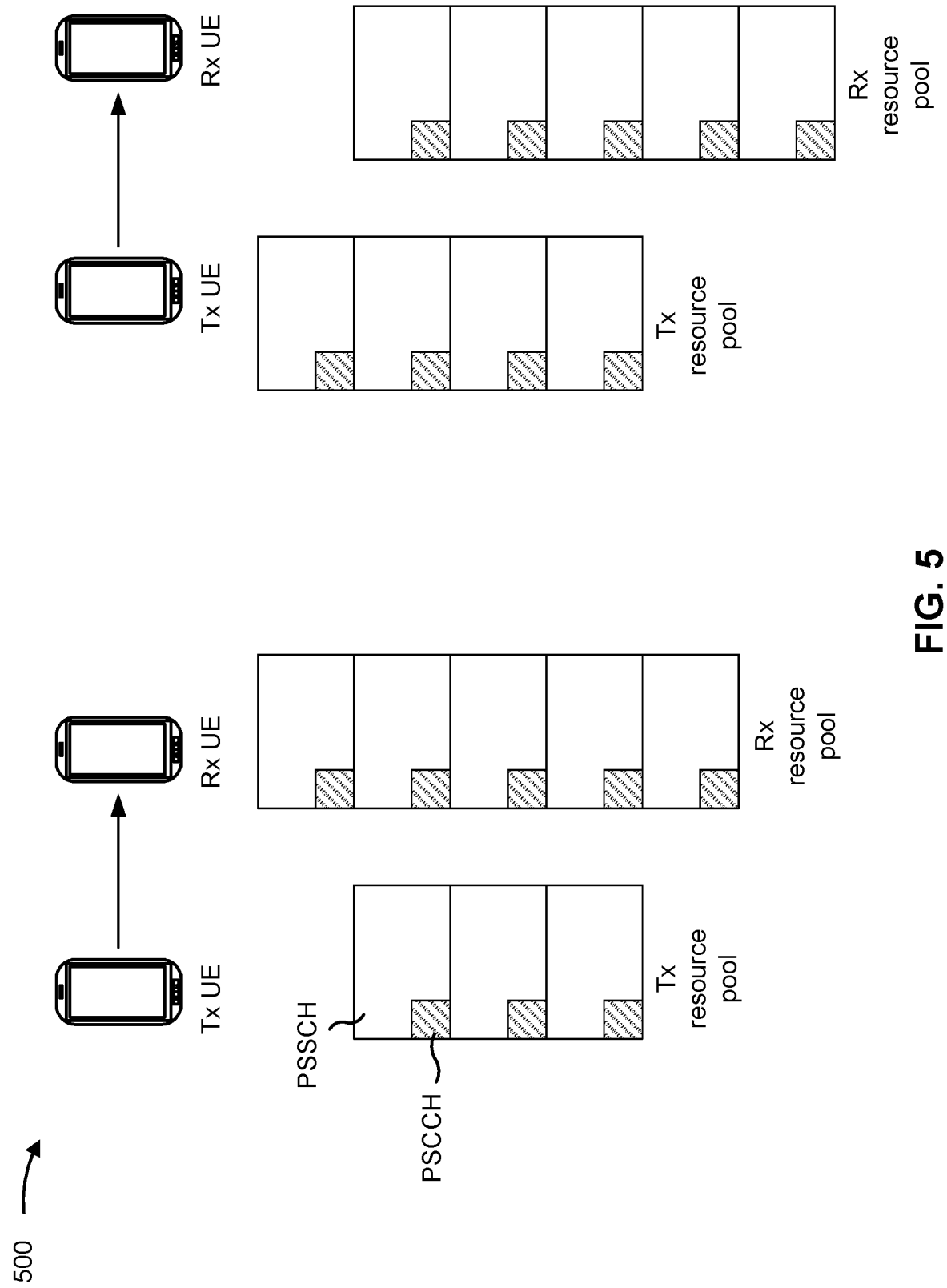
FIG. 5 is a diagram illustrating examples of sidelink resource pools, in accordance with the present disclosure

FIG. 5 is a diagram illustrating examples 500 and 510 of sidelink resource pools, in accordance with the present disclosure.

As shown in FIG. 5, UEs (e.g., UE 120) may be configured with sidelink resource pools for transmitting and receiving sidelink communications. Each UE may be configured with a set of Rx resource pools in a sidelink BWP. In some aspects, in a case in which multiple sidelink BWPs are configured for a UE, the UE may be configured with a respective set of Rx resource pools in each sidelink BWP. Each Rx resource pool identifies a set of frequency resources (e.g., subchannels) and time resources for receiving sidelink communications from other UEs. As shown in FIG. 5, each Rx resource pool may include resources (e.g., frequency and time resources) for receiving PSCCH communications and resources (e.g., frequency and time resources) for receiving PSSCH communications. A UE may monitor all Rx pools configured for the UE (e.g., in an active sidelink BWP) for sidelink communications (e.g., SCI and/or sidelink data transmissions) from other UEs.

As further shown in FIG. 5, each UE may also be configured with a set of Tx resource pools in a sidelink BWP. In some aspects, in a case in which multiple sidelink BWPs are configured for a UE, the UE may be configured with a respective set of Tx resource pools in each sidelink BWP. Each Tx resource pool identifies a set of frequency resources (e.g., subchannels) and time resources for transmitting sidelink communications to other UEs. As shown in FIG. 5, each Tx resource pool may include resources (e.g., frequency and time resources) for transmitting PSCCH communications and resources (e.g., frequency and time resources) for transmitting PSSCH communications. The UE may transmit sidelink communications (e.g., SCI and/or sidelink data transmissions) to other UEs in resources (e.g., PSCCH and/or PSSCH subchannels) selected from a Tx resource pool. For example, in Mode 2, the UE may perform channel sensing in each Tx resource pool, and select, from a Tx resource pool, frequency resources (e.g., subchannels) and time resources for transmitting sidelink communications based at least in part on the channel sensing. The sidelink resource pool for a UE in a sidelink BWP may collectively refer to the set of Tx resource pools and the set of Rx resource pools configured for the UE in the sidelink BWP.

In order for sidelink communications from a Tx UE to be received by an Rx UE, the Tx UE must transmit the sidelink communications (e.g., PSCCH and/or PSSCH communications) in subchannels which are included in the Rx resource pool of the Rx UE. As shown in FIG. 5, example 500 shows an example of a Tx resource pool configured for a Tx UE and an Rx resource pool configured for an Rx UE. As shown in example 500, the Tx resource pool configured for a Tx UE is within the Rx resource pool configured for an Rx UE. That is, all of the subchannels in the Tx resource pool configured for the Tx UE are included within the Rx resource pool configured for the Rx UE. In this case, the Tx UE may transmit sidelink communications to the Rx UE in any of the subchannels in the TX resource pool.

As shown in FIG. 5, example 500 shows another example of a Tx resource pool configured for a Tx UE and an Rx resource pool configured for an Rx UE. As shown in example, 510, the Tx resource pool configured for the Tx UE includes subchannels that overlap with the subchannels in the Rx resource pool configured for the RX UE, but the Tx resource pool configured for the Tx UE also includes a subchannel that is not included in the Rx resource pool configured for the Rx UE. In this case, the Tx UE may need to transmit sidelink communications to the Rx UE in subchannels that overlap with the subchannels in the Rx resource pool in order to for the Rx UE to able to receive the sidelink communications.

In some examples, in order for a Tx UE to transmit sidelink communications in a subchannel that is monitored by an Rx UE, the Tx UE may be aware of Rx pool information configured for the Rx UE (e.g., via configuration by a base station or via information sharing between the Tx UE and the Rx UE). In Mode 1, downlink control information (DCI) (e.g., DCI format 3_0) transmitted from a base station to the Tx UE may have a resource pool index for the Tx UE, but no destination index. In this case, the Tx UE may send sidelink communications (e.g., PSCCH and/or PSSCH communications) in the allocated subchannel indicated in the DCI to an Rx UE that is configured with an Rx resource pool that included that subchannel. In Mode 2, the Tx UE may select a subchannel that is included in the Rx resource pool configured for an Rx UE to use to transmit sidelink communications (e.g., PSCCH and/or PSSCH communications) to the Rx UE.

As indicated above, FIG. 5 is provided as an example. Other examples may differ from what is described with respect to FIG. 5.

In some aspects, multiple sidelink BWPs may be configured in a sidelink CC, and UEs may dynamically switch a current active sidelink BWP for the sidelink CC. For example, sidelink BWP switching may be beneficial to reduce power consumption by UEs and accommodate different UEs types. For communications on the Uu interface (e.g., downlink and uplink communications), only the UE may perform BWP switching (e.g., the base station may not perform BWP switching). However, for sidelink communications, both the Tx UE and the Rx UE may perform BWP switching. In some cases, in Mode 1, the base station may control sidelink BWP switching of both the Tx UE and the Rx UE. In this case, the base station may ensure that the activated sidelink BWPs for the Tx UE and the Rx UE include matching sidelink resource pools (e.g., Tx and Rx resource pools with overlapping subchannels), and the base station may use Uu radio resource control (RRC) messages, medium access control (MAC) control elements (MAC-CEs), and/or DCI to indicate, to the Tx UE and the Rx UE, the activated BWPs for the Tx UE and Rx UE. However, in some cases, such as in Mode 2 or in Mode 1 when the base station controls the sidelink BWP switching of only the Tx UE, the base station may not ensure that the activated sidelink BWPs for the UEs include matching sidelink resource pools. In such cases, without further coordination of sidelink BWP switching between the UEs, the Rx resource pool configured in activated sidelink BWP for the Rx UE may not match with the Tx resource pool configured in the activated sidelink BWP for the Tx UE. As a result, the Tx UE may transmit sidelink communications in a subchannel that is not monitored by the Rx UE, resulting in decreased reliability of sidelink communications and increased traffic latency due to repetition of sidelink communications.

Some techniques and apparatuses described herein enable a first UE to transmit, to a second UE, a first message to indicate a sidelink BWP switch, for the first UE, to a first sidelink BWP. In some aspects, the first message may include an indication of the first sidelink BWP and a first sidelink resource pool in the first sidelink BWP. The second UE may transmit, to the first UE, a second message that confirms the sidelink BWP switch for the first UE. The first UE may transmit, to the second UE, a third message to activate the sidelink BWP switch, for the first UE, to the first sidelink BWP, based at least in part on receiving the second message that confirms the sidelink BWP switch. In some aspects, the first UE may switch to the first sidelink BWP after a BWP switching time duration from the third message. In some aspects, the second UE may select a second sidelink BWP based at least in part on receiving the first message, and the third message may activate a sidelink BWP switch, for the second UE, to the second sidelink BWP. As a result, the first UE and the second UE may coordinate to activate sidelink BWPs with matching sidelink resource pools for transmitting and receiving sidelink communications. This may increase reliability of sidelink communications and decrease traffic when switching sidelink BWPs.

Figure 6:
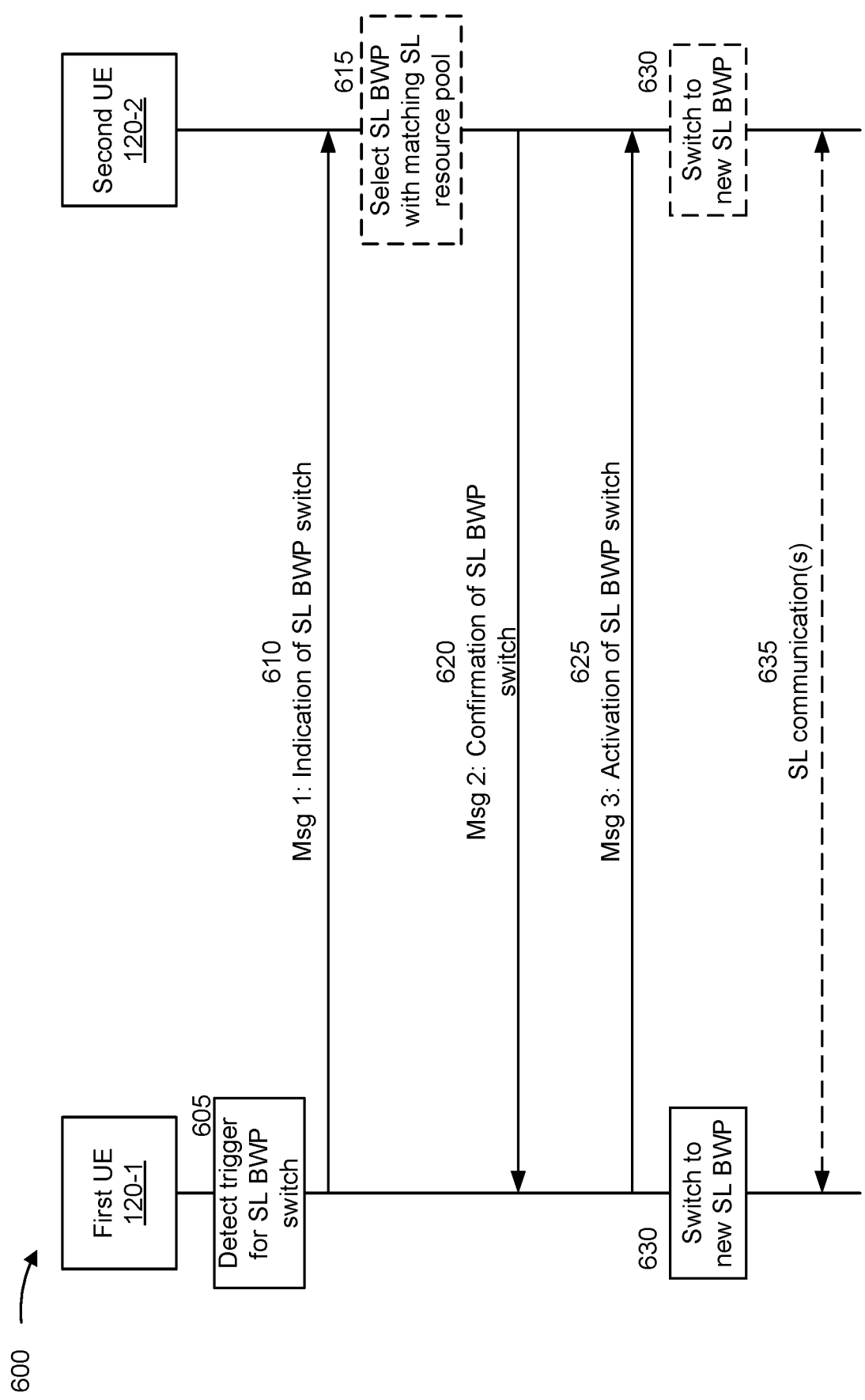
FIGS. 6-11 are diagrams illustrating examples associated with sidelink bandwidth part (BWP) switching, in accordance with the present disclosure.

FIG. 6 is a diagram illustrating an example 600 associated with sidelink BWP switching, in accordance with the present disclosure. As shown in FIG. 6, example 600 includes communication between a first UE 120-1 and a second UE 120-2. In some aspects, the first UE 120-1 and/or the second UE 120-2 may be included in a wireless network, such as wireless network 100. The first UE 120-1 and the second UE 120-2 may communicate via a sidelink (e.g., via the PC5 interface). In some aspects, the first UE 120-1 may be a Tx UE and the second UE 120-2 may be an Rx UE. In some aspects, the first UE 120-1 may be an Rx UE and the second UE 120-2 may be a Tx UE As shown in FIG. 6, and by reference number 605, the first UE 120-1 may detect a trigger for a sidelink BWP switch. The trigger for the sidelink BWP switch may trigger a sidelink BWP switch, for the first UE 120-1, from a current active sidelink BWP to a new active sidelink BWP (e.g., a first sidelink BWP). In some aspects, such as in a case in which the first UE 120-1 is operating in Mode 1, the trigger for the sidelink BWP switch may be included in DCI received from the base station (e.g., base station 110). For example, the base station may transmit, to the first UE 120-1, DCI including an indication for the first UE 120-1 to switch from the current active sidelink BWP to the first sidelink BWP.

In some aspects, such as in a case in which the first UE 120-1 is operating in Mode 2, the trigger for the sidelink BWP switch may be a condition detected by the first UE 120-1, that causes the first UE 120-1 to select a new active sidelink BWP (e.g., the first sidelink BWP). In some aspects, the trigger for the sidelink BWP switch may be based at least in part on a sidelink congestion level associated with the current active sidelink BWP. For example, the first UE 120-1 may determine the congestion level of the current active sidelink BWP (e.g., using channel sensing), and first UE 120-1 may compare the congestion level of the current active sidelink BWP to high congestion threshold and/or a low congestion threshold. In a case, in which the congestion level of the current active sidelink BWP satisfies (e.g., is greater than (or greater than or equal to)) the high congestion threshold, the first UE 120-1 may determine to switch to a larger sidelink BWP. In a case, in which the congestion level of the current active sidelink BWP satisfies (e.g., is less than (or less than or equal to)) the low congestion threshold, the first UE 120-1 may determine to switch to a smaller sidelink BWP. In some aspects, the first UE 120-1 may detect the trigger for the sidelink BWP switch based at least in part on the resource pools used for sidelink communications in the current active sidelink BWP. For example, in a case in which sidelink communications are transmitted only in a subset of the sidelink resource pools configured in the current active sidelink BWP, the first UE 120-1 may determine to switch to a smaller sidelink BWP that includes the sidelink resource pools being used for the sidelink communications.

In some aspects, the trigger for the sidelink BWP switch may be associated with a timer, configured for the first UE 120-1, for switching the active sidelink BWP. In some aspects, the first UE 120-1 may be configured with one or more timers for switching between different configured sidelink BWPs for the first UE 120-1 according to a traffic pattern for the sidelink communications. For example, the first UE 120-1 may switch between active sidelink BWPs based at least in part on an inactive timer associated with an inactive time duration in which no sidelink traffic is expected to be transmitted and/or received by the first UE 120-1 and an active time duration in which sidelink traffic is expected to be transmitted and/or received by the first UE 120-1. In this case, respective sidelink BWPs for the inactive time duration and the active time duration may be configured for the first UE 120-1.

In some aspects, the trigger for the sidelink BWP switch may be an indication received from another UE. For example, the first UE 120-1 may receive, from another UE, a first message (e.g., Msg 1) (described below) that indicates a sidelink BWP switch for the other UE, and the first UE 120-1 may select a new active sidelink BWP (e.g., the first sidelink BWP) based at least in part on the sidelink BWP switch for the other UE. In this case, the first UE 120-1 may select the first sidelink BWP based at least in part on the first sidelink BWP including a sidelink resource pool that matches (e.g., has overlapping subchannels) with a sidelink resource pool in the new sidelink BWP for the other UE.

In some aspects, the first UE 120-1 may be configured (e.g., via one or more Uu RRC messages received from a base station) with multiple sidelink BWPs on a sidelink CC. In some aspects, in which the first UE 120-1 detects the trigger for the sidelink BWP switch, the first UE 120-1 may select the new active sidelink BWP (e.g., the first sidelink BWP) from the multiple configured sidelink BWPs on the CC. In a case of sidelink carrier aggregation, the first UE 120-1 may select a new sidelink BWP per sidelink CC. In some aspects, in a case in which a base station transmits, to the first UE 120-1 DCI indicating the new active sidelink BWP (e.g., the first sidelink BWP) for the first UE 120-1, the DCI may include an indication of a sidelink BWP index that identifies which of the configured sidelink BWPs is the new active sidelink BWP for the first UE 120-1.

As further shown in FIG. 6, and by reference number 610, the first UE 120-1 may transmit, to the second UE 120-2, a first message ("Msg 1") that indicates the sidelink BWP switch, for the first UE 120-1, from a current active sidelink BWP to the first sidelink BWP. The first UE 120-1 may transmit Msg 1, to the second UE 120-2, to initiate the sidelink BWP switch, for first UE 120-1, to the first sidelink BWP. For example, the first UE 120-1 may transmit Msg 1 to the second UE 120-2 based at least in part on detecting the trigger for the sideline BWP switch, and Msg 1 may indicate, to the second UE 120-2, a desire or intention of first UE 120-1 to switch to the first sidelink BWP.

In some aspects, Msg 1 may include an indication of the first sidelink BWP (e.g., the new active sidelink BWP for the first UE 120-1) and a sidelink resource pool (e.g., a first sidelink resource pool) in the first sidelink BWP. In some aspects, Msg 1 may include information identifying the first sidelink BWP for the first UE 120-1 and information identifying the first sidelink resource pool in the first sidelink BWP. In some aspects, the second UE 120-2 may be aware of (e.g., via one or more Uu RRC messages from a base station or via one or more PC5 RRC messages from the first UE 120-1) the configured sidelink BWPs for the first UE 120-1. In this case, Msg 1 may include an indication of a sidelink BWP index associated with the first sidelink BWP for the first UE 120-1. In some aspects, Msg 1 may include an index identifying the first sidelink resource pool in the first sidelink BWP. In some aspects, the first UE 120-1 may be a Tx UE, and the first sidelink resource pool may include a Tx resource pool for the first UE 120-1. In some aspects, the first UE 120-1 may be an Rx UE, and the first sidelink resource pool may include an Rx resource pool for the first UE 120-1. In some aspects, the first UE 120-1 may be initiating (e.g., via Msg 1) a sidelink BWP switch for bi-directional sidelink communications with the second UE 120-2. In this case, the first sidelink resource pool may include a Tx resource pool for transmitting sidelink communications and an Rx resource pool for receiving sidelink communications.

In some aspects, the first UE 120-1 may transmit Msg 1 to the second UE 120-2 via SCI (e.g., SCI-1 or SCI-2). In some aspects, the first UE 120-1 may transmit Msg 1 to the second UE 120-2 via a PC5 MAC-CE. In some aspects, the first UE 120-1 may transmit Msg 1 to the second UE 120-2 via a PC5 RRC message. In some aspects, the first UE 120-1 may transmit Msg 1 to a plurality of UEs including the second UE 120-2. For example, the first UE 120-1 may broadcast Msg 1 to all UEs in a coverage area of the first UE 120-1. In some aspects, the first UE 120-1 may transmit Msg 1 to a plurality of wireless network devices including the second UE 120-2, one or more other UEs, and/or a base station.

As further shown in FIG. 6, and by reference number 615, in some aspects, the second UE 120-2 may select a new active sidelink BWP (e.g., a second sidelink BWP) with a sidelink resource pool (e.g., a second sidelink resource pool) that matches the first sidelink resource pool in the first sidelink BWP associated with the first UE 120-1. The second UE 120-2 may receive Msg 1 from the first UE 120-1, and the second UE 120-2 may determine, based at least in part on the indication of the first sidelink BWP and the first sidelink resource pool in Msg 1, whether to switch the active sidelink BWP for the second UE 120-2 from a current active sidelink BWP. In some aspects, the second UE 120-2 may determine whether to switch the active sidelink BWP for the second UE 120-2 based at least in part on a determination of whether the sidelink resource pool in the current active sidelink BWP for the second UE 120-2 matches with the first sidelink resource pool in the first sidelink BWP indicated in Msg 1. For example, the second UE 120-2 may determine whether one or more Rx resource pools in the current active sidelink BWPs include overlapping subchannels with a Tx resource pool in the first sidelink resource pool and/or whether one or more Tx resource pools in the current active sidelink BWP include overlapping subchannels with an Rx resource pool in the first sidelink resource pool.

In some aspects, the second UE 120-2 may determine to switch the active sidelink BWP for the second UE 120-2 based at least in part on a determination that the sidelink resource pool in the current active sidelink BWP for the second UE 120-2 does not match with the first sidelink resource pool in the first sidelink BWP associated with the first UE 120-1 (e.g., the Rx resource pool(s) in the current active sidelink BWP does not overlap with the Tx resource pool in the first sidelink resource pool and/or the Tx resource pool(s) in the current active sidelink BWP does not overlap with the Rx resource pool in the first sidelink resource pool). In this case, second UE 120-2 may select a new sidelink BWP (e.g., the second sidelink BWP) based at least in part on the indication of the first sidelink BWP and the first sidelink resource pool in Msg 1. For example, the second UE 120-2 may select a new sidelink BWP (e.g., the second sidelink BWP) that includes a sidelink resource pool (e.g., the second sidelink resource pool) that matches with the first sidelink resource pool associated with the first UE 120-1. In some aspects, the second UE 120-2 may be an Rx UE, and the second sidelink resource pool may include an Rx resource pool that matches (e.g., includes one or more overlapping subchannels) with a Tx resource pool of the first sidelink resource pool. In some aspects, the second UE 120-2 may be a Tx UE, and the second sidelink resource pool may include a Tx resource pool that matches (e.g., includes one or more overlapping subchannels) with an Rx resource pool of the first sidelink resource pool. In some aspects, the second sidelink resource pool may be used for bi-directional sidelink communications with the first UE 120-1. In this case, the second sidelink resource pool may include an Rx resource pool that matches (e.g., includes one or more overlapping subchannels) with a Tx resource pool of the first sidelink resource pool, and the second sidelink resource pool may include a Tx resource pool that matches (e.g., includes one or more overlapping subchannels) with an Rx resource pool of the first sidelink resource pool. In some aspects, the second UE 120-2 may also select the second sidelink resource pool in the second sidelink BWP such that the Tx resource pool matches with other Tx resource pools associated with the first UE 120-1 and/or other UEs. In this way the second UE 120-2 may be able to decode SCI-1 communications from other UEs that reserve resources in the Tx resource pool for the second UE 120-2.

In some aspects, based at least in part on a determination that the sidelink resource pool of the current active sidelink BWP matches with the first sidelink resource pool indicated in Msg 1, the second UE 120-2 may determine not to switch the active sidelink BWP for the second UE 120-2. In some aspects, in a case in which a current Tx resource pool (in the current active sidelink BWP for the second UE 120-2) does not match with the Rx resource pool in the first sidelink resource pool, but another Tx resource pool configured for the current active sidelink BWP for the second UE 120-2 does match with the Rx resource pool in the first sidelink resource pool, the second UE 120-2 may determine to switch to the Tx resource pool in the current active sidelink BWP that matches with the Rx resource pool in the first sidelink resource pool.

In some aspects, the second UE 120-2 may determine whether to confirm the sidelink BWP switch, for the first UE 120-1, to the first sidelink BWP. In some aspects, the second UE 120-2 may determine whether to confirm the sidelink BWP switch for the first UE 120-1 based at least in part on the sidelink BWP switching determination for second UE 120-2. For example, the second UE 120-2 may confirm the sidelink BWP switch in connection with a determination that the second UE 120-2 does not need to switch the active sidelink BWP for the second UE 120-2 or a determination that the second UE 120-2 can switch to the second sidelink BWP that includes the second sidelink resource pool that matches with the first sidelink resource pool in the first sidelink BWP indicated in Msg 1. In some aspects, the second UE 120-2 may determine not to confirm the sidelink BWP switch for the first UE 120-1 in connection with a determination that the second UE 120-2 cannot switch to a sidelink BWP with a sidelink resource pool that matches the first sidelink resource pool in the first sidelink BWP. Additionally, or alternatively, the second UE 120-2 may determine whether to confirm the sidelink BWP switch for the first UE 120-1 based at least in part on a determination of whether an associated sidelink BWP switch for the second UE 120-2 would disrupt sidelink communications between the second UE 120-2 and another UE. For example, the second UE 120-2 may determine not to confirm the sidelink BWP switch for the first UE 120-1 in connection with a determination that the sidelink BWP switch, for the second UE 120-2, to the second sidelink BWP would cause the second UE 120-2 to no longer be able to transmit or receive sidelink communications with another UE in matching sidelink resource pools.

As further shown in FIG. 6, and by reference number 620, the second UE 120-2 may transmit, to the first UE 120-1, a second message ("Msg 2") including an indication of whether the second UE 120-2 confirms the sidelink BWP switch for the first UE 120-1. In some aspects, as shown in FIG. 6, Msg 2 may include a confirmation of the sidelink BWP switch for the first UE 120-1. In some aspects, Msg 2 may include an indication that the second UE 120-2 does not confirm the sidelink BWP switch for the first UE 120-1.

In a case in which the second UE 120-2 determines to switch to the second sidelink BWP, the Msg 2 that confirms the sidelink BWP switch for the first UE 120-1 may also include an indication of the second sidelink BWP and the second sidelink resource pool associated with the sidelink BWP switch for the second UE 120-2. In this case, Msg 2 may include information identifying the second sidelink BWP for the second UE 120-2 and information identifying the second sidelink resource pool in the second sidelink BWP. In some aspects, the first UE 120-1 may be aware of (e.g., via one or more Uu RRC messages from a base station or via one or more PC5 RRC messages from the second UE 120-2) the configured sidelink BWPs for the second UE 120-2. In this case, Msg 2 may include an indication of a sidelink BWP index associated with the second sidelink BWP for the second UE 120-2. In some aspects, Msg 2 may include an index identifying the second sidelink resource pool in the second sidelink BWP. In some aspects, the second UE 120-2 may receive one or more other Msg 1s from one or more other UEs, in addition to the Msg 1 received from the first UE 120-1. In this case, the second UE 120-2 may transmit a respective Msg 2 to each UE from which the second UE 120-2 received a Msg 1.

In some aspects, Msg 2 may be a PSFCH message. In this case, Msg 2 may include an ACK that indicates a confirmation of the sidelink BWP switch for the first UE 120-1, or Msg2 may include a negative acknowledgement (NACK) that indicates that the second UE 120-2 does not confirm the sidelink BWP switch for the first UE 120-1. In some aspects, bits may be added to the PSFCH message to indicate the new sidelink BWP information (e.g., the second sidelink BWP and the second sidelink resource pool) for the second UE 120-2. In some aspects, the second UE 120-2 may transmit Msg 2 in SCI, a PC5 MAC-CE, or a PC5 RRC message.

The first UE 120-1 may receive the Msg 2 from the second UE 120-2. In some aspects, the first UE 120-1 may receive a respective Msg 2 from each of a plurality of wireless network devices that received Msg 1 from the first UE 120-1. In some aspects, the plurality of wireless network devices may include a plurality of UEs, including the second UE 120-2. In some aspects, the plurality of wireless network devices may include the second UE 120-2, one or more other UEs, and/or a base station. The respective Msg 2 received from each wireless network device may include an indication that confirms or does not confirm the sidelink BWP switch for the first UE 120-1.

As further shown in FIG. 6, and by reference number 625, the first UE 120-1 may transmit, to the second UE 120-2, a third message ("Msg 3") to activate the sidelink BWP switch, for the first UE 120-1, to the first sidelink BWP. The first UE 120-1 may transmit Msg 3 based at least in part on receiving the Msg 2 that confirms the sidelink BWP switch for the first UE 120-1.

In some aspects, the first UE 120-1 may determine whether to proceed with activating the sidelink BWP switch based at least in part on the Msg 2 messages received from the second UE 120-2 and/or other wireless network devices (e.g., other UEs and/or a base station). The first UE 120-1 may transmit Msg 3 to the second UE 120-2 (and other wireless network devices) to activate the sidelink BWP switch for the first UE 120-1 in connection with a determination to proceed with activating the sidelink BWP switch. Msg 3 provides confirmation, to the second UE 120-2 (and the other wireless network devices) of the actual sidelink BWP switch, for the first UE 120-1, to the first sidelink BWP. In some aspects, in a case in which the first UE 120-1 determines not to proceed with activating the sidelink BWP switch in connection with the Msg 2 messages, the first UE 120-1 may not transmit Msg 3.

In some aspects, in a case in which the first UE 120-1 transmits Msg 1 to a plurality of UEs (e.g., peer UEs) including the second UE 120-2, the first UE 120-1 may determine whether to proceed with activating the sidelink BWP switch and transmit Msg 3 only after the first UE 120-1 receives the respective Msg 2 from each UE of the plurality of UEs. In some aspects, in a case in which the first UE 120-1 transmits Msg 1 to a plurality of UEs (e.g., peer UEs) including the second UE 120-2, the first UE 120-1 may set a timer for receiving the Msg 2 messages. For example, the timer may run for a time duration starting from transmission of Msg 1 by the first UE 120-1. In this case, the first UE 120-1 may determine whether a respective Msg 2 is received from each of the plurality of UEs within the time duration starting from transmission of Msg 1. In some aspects, the first UE 120-1, in connection with a determination that the respective Msg 2 is not received from a UE, may determine that the respective Msg 2 from that UE does not confirm the sidelink BWP switch for the first UE 120-1. That is, in this case, the first UE 120-1 may treat a missing Msg 2 as an indication that a UE does not confirm (or approve of) the sidelink BWP switch for the first UE 120-1. In some aspects, the first UE 120-1, in connection with a determination that the respective Msg 2 is not received from a UE, may re-transmit Msg 1 to that UE.

In some aspects, the first UE 120-1 may transmit Msg 1 to a plurality of wireless network devices (e.g., one or more UEs, including the second UE 120-2, and/or a base station). In some aspects, the determination, by the first UE 120-1, of whether to proceed with activating the sidelink BWP switch to the first sidelink BWP, may be based at least in part on the indications, in the Msg 2s received from the wireless network devices, of whether the wireless network devices confirm or do not confirm the sidelink BWP switch for the first UE 120-1. In some cases, the first UE 120-1 may receive one or more Msg 2s that confirm the switch (e.g., one or more ACKs in the case in which Msg 2 is a PSFCH message) and one or more Msg 2s that do not confirm the switch (e.g., one or more NACKs in the case in which Msg 2 is a PSFCH message). In some aspects, the first UE 120-1 may determine not to proceed with activating the sidelink BWP switch only in the case in which all of the Msg 2s received by the first UE 120-1 do not confirm the sidelink BWP switch (e.g., the first UE 120-1 receives all NACKs). In this case, the first UE 120-1 may determine to proceed with activating the sidelink BWP switch in connection with receiving a Msg 2 confirming the sidelink BWP switch (e.g., an ACK) from at least one of the wireless network devices. In some aspects, the first UE 120-1 may determine to proceed with activating the sidelink BWP switch in connection with all of the Msg 2s received by the first UE 120-1 confirming the sidelink BWP switch (e.g., the first UE 120-1 receives all ACKs). In this case, the first UE 120-1 may determine not to proceed with activating the sidelink BWP switch in connection with receiving a Msg 2 that does not confirm the sidelink BWP switch (e.g., a NACK) from at least one of the wireless network devices.

In some aspects, the first UE 120-1 may determine whether to proceed with activating the sidelink BWP switch based at least on priorities of the received Msg 2s. In this case, Msg 2s from different wireless network devices may be associated with different priorities, and the first UE 120-1 may determine whether to proceed with activating the sidelink BWP switch based at least in part on the highest priority Msg 2 received by the first UE 120-1. For example, the Msg 2 received from the second UE 120-2 may be associated with a higher priority than a Msg 2 received from another UE (e.g., a third UE). In this case, if the Msg 2 received from the second UE 120-2 confirms the sidelink BWP switch for the first UE 120-1 and the Msg 2 received from the third UE does not confirm the sidelink BWP switch for the first UE 120-1, the first UE 120-1 may determine to proceed with activating the sidelink BWP switch (and transmit Msg 3) based at least in part on the priorities of the Msg 2s. In some aspects, in a case in which the first UE 120-1 has a Uu link with a base station (e.g., the first UE 120-1 is in a coverage area of the base station), the base station may also transmit a Msg 2 to the first UE 120-1 to indicate whether the base station confirms or does not confirm the sidelink BWP switch for the first UE 120-1. In this case, the Msg 2 from the base station may be associated with a highest priority.

The first UE 120-1 may transmit Msg 3 to the second UE 120-2 (and one or more other UEs) in connection with the determination to proceed with activating the sidelink BWP switch. Msg 3 may activate the sidelink BWP switch, for the first UE 120-1, to the first sidelink BWP. In some aspects, Msg 3 may establish a time at which the sidelink BWP switch, for the first UE 120-1, to the first sidelink BWP is to occur. For example, the sidelink BWP switch for the first UE 120-1 may occur after a BWP switching time duration from the transmission of Msg 3. In some aspects, the BWP switching time duration may be indicated in Msg 3. In some aspects, the BWP switching time duration may be configured for the UEs or preconfigured according to a wireless communication standard. In some aspects, in a case in which the second UE 120-2 determines to switch to the second sidelink BWP, Msg 3 may also activate the sidelink BWP switch, for the second UE 120-2, to the second sidelink BWP. In this case, Msg 3 may activate the sidelink BWP switch for the second UE 120-2 to occur at the same time as the sidelink BWP switch for the first UE 120-1. For example, the sidelink BWP switch for the first UE 120-1 and the sidelink BWP switch for the second UE 120-2 may both occur after the BWP switching time duration from the transmission of Msg 3.

In some aspects, Msg 3 may activate sidelink BWP switches for one or more other UEs in addition to the first UE 120-1 and the second UE 120-2. In some aspects, the first UE 120-1 may groupcast Msg 3 to a group of peer UEs to set a common reference time (e.g., after the BWP switching time duration) for sidelink BWP switching for the group of peer UEs. In some aspects, the first UE 120-1 may transmit Msg 3 via SCI. In some aspects, the first UE 120-1 may transmit Msg 3 via a PC5 MAC-CE. In some aspects, the first UE 120-1 may transmit Msg 3 via a PC5 RRC message.

As further shown in FIG. 6, and by reference number 630, the first UE 120-1 may switch to the new sidelink BWP for the first UE 120-1 (e.g., the first sidelink BWP). In some aspects, the second UE 120-2 may also switch to the new sidelink BWP for the second UE 120-2 (e.g., the second sidelink BWP) at the same time as the sidelink BWP switch for the first UE 120-1 based at least in part on receiving Msg 3. For example, the first UE 120-1 may switch to the first sidelink BWP and the second UE 120-2 may switch to the second sidelink BWP after the BWP switching time duration from transmission of Msg 3.

As further shown in FIG. 6, and by reference number 635, the first UE 120-1 and the second UE 120-2 may communicate using the new sidelink BWPs for the first UE 120-1 and the second UE 120-2. In some aspects, the first UE 120-1 may transmit one or more sidelink communications using the first sidelink resource pool (e.g., a Tx resource pool in the first sidelink resource pool) in the first sidelink BWP. In this case, the second UE 120-2 may receive the one or more sidelink communications using the second sidelink resource pool (e.g., an Rx resource pool in the second sidelink resource pool) in the second sidelink BWP. The first UE 120-1 may transmit the one or more sidelink communications in subchannels of the Tx resource pool in the first sidelink resource pool that overlap with subchannels included in the Rx resource pool in the second sidelink resource pool.

In some aspects, the second UE 120-2 may transmit one or more sidelink communications using the second sidelink resource pool (e.g., a Tx resource pool in the second sidelink resource pool) in the second sidelink BWP. In this case, the first UE 120-1 may receive the one or more sidelink communications using the first sidelink resource pool (e.g., an Rx resource pool in the first sidelink resource pool) in the first sidelink BWP. The second UE 120-2 may transmit the one or more sidelink communications in subchannels of the Tx resource pool in the second sidelink resource pool that overlap with subchannels included in the Rx resource pool in the first sidelink resource pool.

As described above, the first UE 120-1 may transmit, to the second UE 120-2, a first message to indicate a sidelink BWP switch, for the first UE 120-1, to a first sidelink BWP. In some aspects, the first message may include an indication of the first sidelink BWP and a first sidelink resource pool in the first sidelink BWP. The second UE 120-2 may transmit, to the first UE 120-1, a second message that confirms the sidelink BWP switch for the first UE 120-1. The first UE 120-1 may transmit, to the second UE 120-2, a third message to activate the sidelink BWP switch, for the first UE 120-1, to the first sidelink BWP, based at least in part on receiving the second message that confirms the sidelink BWP switch. In some aspects, the first UE 120-1 may switch to the first sidelink BWP after a BWP switching time duration from the third message. In some aspects, the second UE 120-2 may select a second sidelink BWP based at least in part on receiving the first message, and the third message may activate a sidelink BWP switch, for the second UE 120-2, to the second sidelink BWP. As a result, the first UE 120-1 and the second UE 120-2 may coordinate to activate sidelink BWPs with matching sidelink resource pools for transmitting and receiving sidelink communications. This may increase reliability of sidelink communications and decrease traffic when switching sidelink BWPs.

As indicated above, FIG. 6 is provided as an example. Other examples may differ from what is described with respect to FIG. 6.

Figure 7:
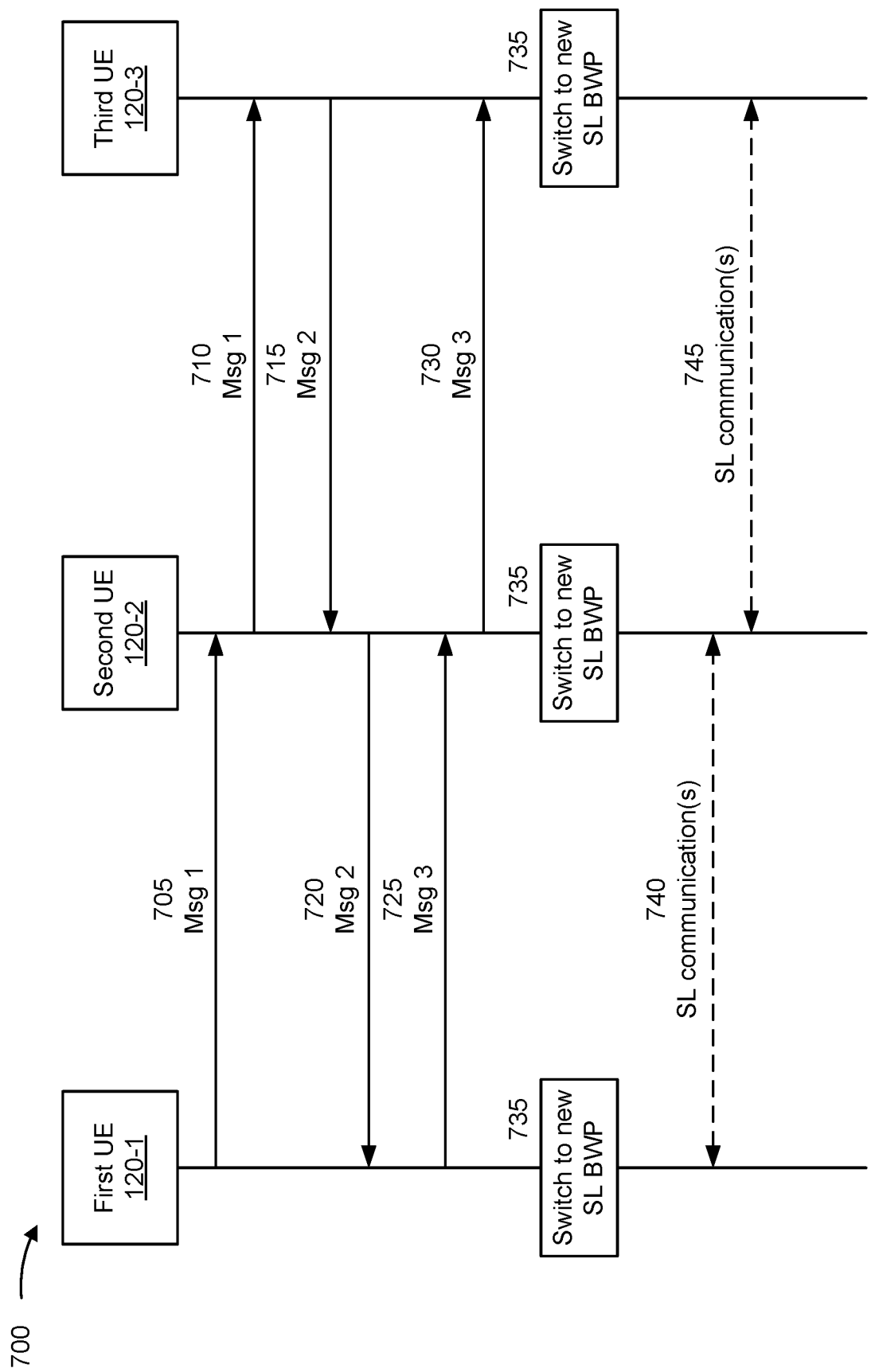

FIG. 7 is a diagram illustrating an example 700 associated with sidelink BWP switching, in accordance with the present disclosure. As shown in FIG. 7, example 700 includes communication between a first UE 120-1, a second UE 120-2, and a third UE 120-3. In some aspects, the first UE 120-1, the second UE 120-2, and/or the third UE 120-3 may be included in a wireless network, such as wireless network 100. The first UE 120-1, the second UE 120-2, and the third UE 120-3 may communicate via a sidelink (e.g., via the PC5 interface).

As shown in FIG. 7, and by reference number 705, the first UE 120-1 may transmit, to the second UE 120-2, a Msg 1 to indicate a sidelink BWP switch, for the first UE 120-1, to a first sidelink BWP. The first UE 120-1 may transmit Msg 1, to the second UE 120-2 to initiate the sidelink BWP switch, for first UE 120-1, to the first sidelink BWP. For example, the first UE 120-1 may transmit Msg 1 to the second UE 120-2 based at least in part on detecting the trigger for the sideline BWP switch, as described above in connection with FIG. 6.

In some aspects, Msg 1 may include an indication of the first sidelink BWP (e.g., the new active sidelink BWP for the first UE 120-1) and a sidelink resource pool (e.g., a first sidelink resource pool) in the first sidelink BWP. In some aspects, the first sidelink resource pool may include a Tx resource pool for transmitting sidelink communications from the first UE 120-1 and/or an Rx resource pool for receiving sidelink communications by the first UE 120-1. In some aspects, the first UE 120-1 may transmit the Msg 1 via SCI, a PC5 MAC-CE, or a PC5 RRC message.

As further shown in FIG. 7, and by reference number 710, the second UE 120-2 may transmit, to the third UE 120-3, another Msg 1 to indicate a sidelink BWP switch, for the second UE 120-2, to a second sidelink BWP. In some aspects, the second UE 120-2, based at least in part on the indication of the first sidelink BWP and the first sidelink resource pool in the Msg 1 received from the first UE 120-1, may determine to switch to a new sidelink BWP (e.g., the second sidelink BWP) that includes a second sidelink resource pool that matches with the first sidelink resource pool. In some aspects, the second UE 120-2 may then cascade the messaging (e.g., Msg 1) to the third UE 120-3 to check the feasibility of switching the active sidelink BWP for the second UE 120-2 to the second sidelink BWP. In this case, the second UE 120-2 may transmit another Msg 1, to the third UE 120-3 to initiate the sidelink BWP switch, for second UE 120-2, to the second sidelink BWP.

In some aspects, the Msg 1 transmitted by the second UE 120-2 may include an indication of the second sidelink BWP (e.g., the new active sidelink BWP for the second UE 120-2) and the second sidelink resource pool in the second sidelink BWP. In some aspects, the first sidelink resource pool may include a Tx resource pool for transmitting sidelink communications from the first UE 120-1 and/or an Rx resource pool for receiving sidelink communications by the first UE 120-1. In some aspects, the first UE 120-1 may transmit the Msg 1 via SCI, a PC5 MAC-CE, or a PC5 RRC message. In some aspects, the second UE 120-2 may also transmit the Msg 1 including the indication of the second sidelink BWP and the second sidelink resource pool to one or more other UEs or one or more other wireless network devices (e.g., a base station).

As further shown in FIG. 7, and by reference number 715, the third UE 120-3 may transmit, to the second UE 120-2, a Msg 2 including an indication of whether the second UE 120-2 confirms the sidelink BWP switch for the second UE 120-2. In some aspects, the third UE 120-3 may determine whether to switch from a current active sidelink BWP (e.g., to a third sidelink BWP with a third sidelink resource pool that matches with the second sidelink resource pool) based at least in part on the indication of the second sidelink BWP and the second sidelink resource pool in the Msg 1 received from the second UE 120-2. In some aspects, in connection with a determination to switch the current sidelink BWP to the third sidelink BWP, the third UE 120-3 may further cascade the messaging (e.g., by sending another Msg 1 to another UE) to check the feasibility of switching to the third sidelink BWP. The third UE 120-3 may determine whether to confirm the sidelink BWP switch for the second UE 120-2. For example, the third UE 120-3 may determine whether to confirm the sidelink BWP switch for the second UE 120-2 based at least in part on the determination of whether to switch the current active sidelink BWP and/or the determination of the feasibility of switching the current active sidelink BWP to the third sidelink BWP.

In some aspects, the third UE 120-3, in connection with a determination to confirm the sidelink BWP switch for the second UE 120-2, may transmit a Msg 2 confirming the sidelink BWP switch for the second UE 120-2. In a case in which the third UE 120-3 determines to switch to the third sidelink BWP, the Msg 2 transmitted by the third UE 120-3 may include an indication of the third sidelink BWP and the third sidelink resource pool in the third sidelink BWP. In some aspects, the third UE 120-3, in connection with a determination not to confirm the sidelink BWP switch for the second UE 120-2, may transmit a Msg 2 that does not confirm the sidelink BWP switch for the second UE 120-2.

As further shown in FIG. 7, and by reference number 720, the second UE 120-2 may transmit, to the first UE 120-1, a Msg 2 that indicates whether the second UE 120-2 confirms the sidelink BWP switch for the first UE 120-1. In some aspects, the second UE 120-2 may determine whether to confirm the sidelink BWP switch for the first UE 120-1 based at least in part on the Msg 2 received from the third UE 120-3. For example, the second UE 120-2 may determine whether the BWP switch, for the second UE 120-2, to the second sidelink BWP is feasible based at least in part on whether the Msg 2 received from the third UE 120-3 confirms or does not confirm the sidelink BWP switch for the second UE 120-2. In some aspects, the second UE 120-2 may determine whether the BWP switch for the second UE is feasible based at least in part on the Msg 2 received from the third UE 120-3 and/or other Msg 2s received from other wireless network devices. For example, the second UE 120-2 may determine whether the BWP switch for the second UE is feasible similarly to the determination, by the first UE 120-1, of whether to proceed with activating the sidelink BWP switch, as described above in connection with FIG. 6.

In some aspects, in connection with the determination that the sidelink BWP switch, for the second UE 120-2, to the second sidelink BWP is feasible, the second UE 120-2 may transmit, to the first UE 120-1, a Msg 2 that confirms the sidelink BWP switch for the first UE 120-1. In this case, the Msg 2 transmitted by the second UE 120-2 may include an indication of the second sidelink BWP and the second sidelink resource pool. In some aspects, in connection with the determination that the sidelink BWP switch, for the second UE 120-2, to the second sidelink BWP, is not feasible, the second UE 120-2 may transmit, to the first UE 120-1, a Msg 2 that indicates that the second UE 120-2 does not confirm the sidelink BWP switch for the first UE 120-1.

As further shown in FIG. 7, and by reference number 725, the first UE 120-1 may transmit, to the second UE 120-2, a Msg 3 to activate the sidelink BWP switch, for the first UE 120-1, to the first sidelink BWP. The first UE 120-1 may transmit Msg 3 based at least in part on receiving, from the second UE 120-2 (and/or one or more other wireless network devices) a Msg 2 that confirms the sidelink BWP switch for the first UE 120-1. In some aspects, the first UE 120-1 may determine whether to proceed with activating the sidelink BWP switch based at least in part on the Msg 2 messages received from the second UE 120-2 and/or other wireless network devices (e.g., other UEs and/or a base station), as described above in connection with FIG. 6.

The first UE 120-1 may transmit the Msg 3 to the second UE 120-2 (and one or more other UEs) in connection with the determination to proceed with activating the sidelink BWP switch. The Msg 3 transmitted by the first UE 120-1 may indicate, to the second UE 120-2, activation of the sidelink BWP switch, for the first UE 120-1, to the first sidelink BWP. The Msg 3 transmitted by the first UE 120-1 may also activate the sidelink BWP switch, for the second UE 120-2, to the second sidelink BWP. In this case, the Msg 3 transmitted by the first UE 120-1 may activate the sidelink BWP switch for the second UE 120-2 to occur at the same time as the sidelink BWP switch for the first UE 120-1. For example, the sidelink BWP switch for the first UE 120-1 and the sidelink BWP switch for the second UE 120-2 may both occur after a first BWP switching time duration from the Msg 3 transmitted by the first UE 120-1.

As further shown in FIG. 7, and by reference number 730, the second UE 120-2 may transmit, to the third UE 120-3, another Msg 3 to activate the sidelink BWP switch, for the second UE 120-2, to the second sidelink BWP. The second UE 120-2 may transmit the Msg 3 to the third UE 120-3 based at least in part on receiving the Msg 3 transmitted by the first UE 120-1. For example, once the first UE 120-1 indicates (e.g., in the Msg 3 transmitted by the first UE 120-1) that the first UE 120-1 is proceeding with activating the sidelink BWP switch for the first UE 120-1, the second UE 120-2 may indicate, in the Msg 3 transmitted to the third UE 120-3, that the second UE 120-2 is proceeding to activate the sidelink BWP switch for the second UE 120-2.

The Msg 3 transmitted by the second UE 120-2 may indicate, to the second UE 120-2, activation of the sidelink BWP switch, for the second UE 120-2, to the second sidelink BWP. The Msg 3 transmitted by the second UE 120-2 may also activate the sidelink BWP switch, for the third UE 120-3, to the third sidelink BWP. In this case, the Msg 3 transmitted by the second UE 120-2 may activate the sidelink BWP switch for the third UE 120-3 to occur at the same time as the sidelink BWP switch for the third UE 120-3 (and the same time as the sidelink BWP switch for the first UE 120-1). For example, the sidelink BWP switch for the second UE 120-2 and the sidelink BWP switch for the third UE 120-3 may both occur after a second BWP switching time duration from the Msg 3 transmitted by the second UE 120-2. In this case, the second switching time duration may be set such that the sidelink BWP switching for the first UE 120-1, the second UE 120-2, and the third UE 120-3 occur at the same time.

As further shown in FIG. 7, and by reference number 735, the first UE 120-1 may switch to the new sidelink BWP for the first UE 120-1 (e.g., the first sidelink BWP), the second UE 120-2 may switch to the new sidelink BWP for the second UE 120-2 (e.g., the second sidelink BWP), and the third UE 120-3 may switch to the new sidelink BWP for the third UE 120-3 (e.g., the third sidelink BWP). In some aspects, the sidelink BWP for the first UE 120-1, the sidelink BWP switch for the second UE 120-2, and the sidelink BWP switch for the third UE 120-3 may occur at the same time based at least in part on the Msg 3 transmitted from the first UE 120-1 and the Msg 3 transmitted from the second UE 120-2.

As further shown in FIG. 7, and by reference number 740, the first UE 120-1 and the second UE 120-2 may communicate using the new sidelink BWPs for the first UE 120-1 and the second UE 120-2. In some aspects, the first UE 120-1 may transmit one or more sidelink communications using the first sidelink resource pool (e.g., a Tx resource pool in the first sidelink resource pool) in the first sidelink BWP. In this case, the second UE 120-2 may receive the one or more sidelink communications using the second sidelink resource pool (e.g., an Rx resource pool in the second sidelink resource pool) in the second sidelink BWP. The first UE 120-1 may transmit the one or more sidelink communications in subchannels of the Tx resource pool in the first sidelink resource pool that overlap with subchannels included in the Rx resource pool in the second sidelink resource pool.

In some aspects, the second UE 120-2 may transmit one or more sidelink communications using the second sidelink resource pool (e.g., a Tx resource pool in the second sidelink resource pool) in the second sidelink BWP. In this case, the first UE 120-1 may receive the one or more sidelink communications using the first sidelink resource pool (e.g., an Rx resource pool in the first sidelink resource pool) in the first sidelink BWP. The second UE 120-2 may transmit the one or more sidelink communications in subchannels of the Tx resource pool in the second sidelink resource pool that overlap with subchannels included in the Rx resource pool in the first sidelink resource pool.

As further shown in FIG. 7, and by reference number 745, the second UE 120-2 and the third UE 120-3 may communicate using the new sidelink BWPs for the second UE 120-2 and the third UE 120-3. In some aspects, the second UE 120-2 may transmit one or more sidelink communications using the second sidelink resource pool (e.g., a Tx resource pool in the second sidelink resource pool) in the second sidelink BWP. In this case, the third UE 120-3 may receive the one or more sidelink communications using the third sidelink resource pool (e.g., an Rx resource pool in the third sidelink resource pool) in the third sidelink BWP. The second UE 120-2 may transmit the one or more sidelink communications in subchannels of the Tx resource pool in the second sidelink resource pool that overlap with subchannels included in the Rx resource pool in the third sidelink resource pool.

In some aspects, the third UE 120-3 may transmit one or more sidelink communications using the third sidelink resource pool (e.g., a Tx resource pool in the third sidelink resource pool) in the third sidelink BWP. In this case, the second UE 120-2 may receive the one or more sidelink communications using the second sidelink resource pool (e.g., an Rx resource pool in the second sidelink resource pool) in the second sidelink BWP. The third UE 120-3 may transmit the one or more sidelink communications in subchannels of the Tx resource pool in the third sidelink resource pool that overlap with subchannels included in the Rx resource pool in the second sidelink resource pool.

As indicated above, FIG. 7 is provided as an example. Other examples may differ from what is described with respect to FIG. 7.

Figure 8:
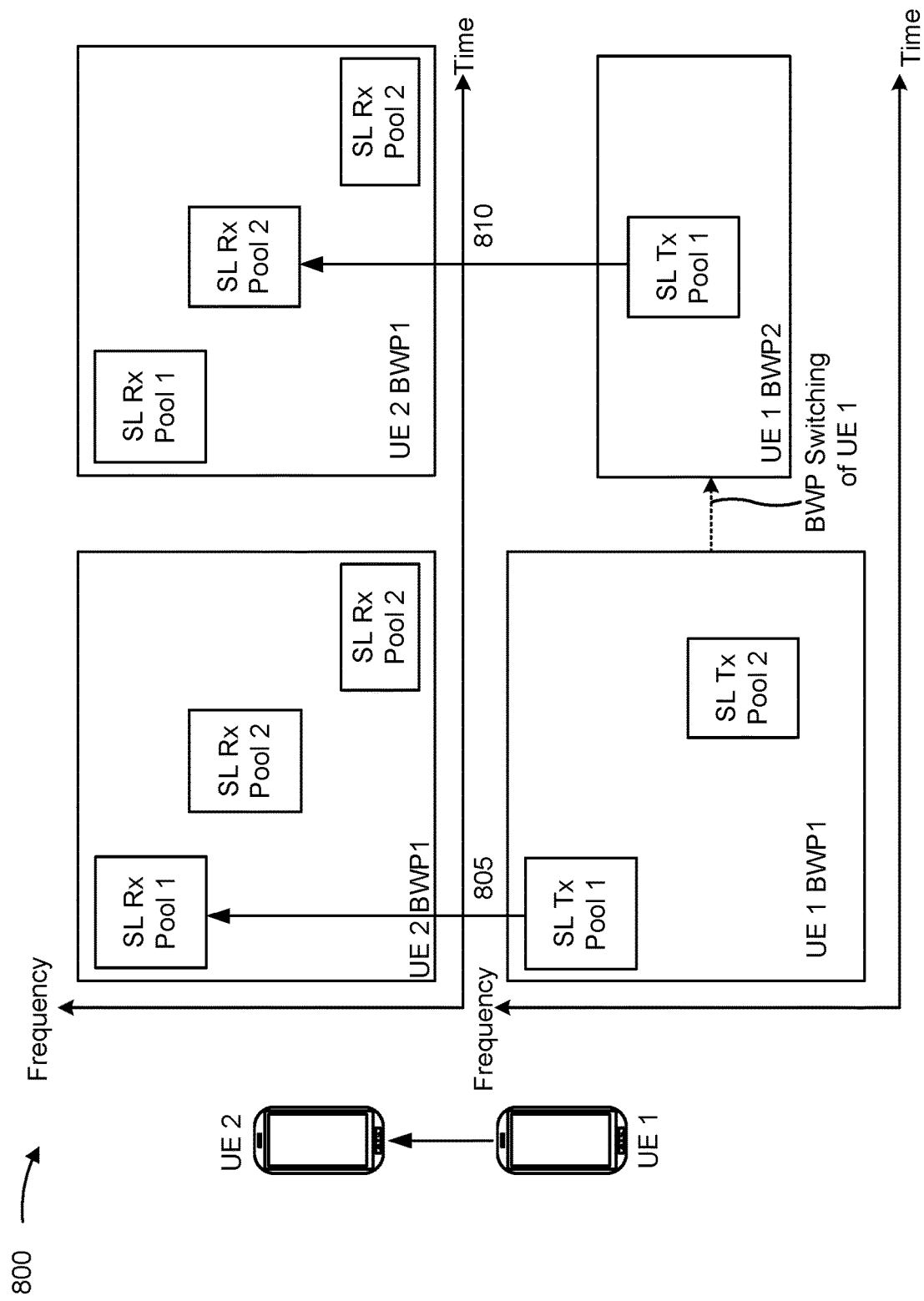

FIG. 8 is a diagram illustrating an example 800 associated with sidelink BWP switching, in accordance with the present disclosure. As shown in FIG. 8, example 800 includes communication between a first UE (UE1) and a second UE (UE2). UE1 may be a Tx UE and UE2 may be an Rx UE.

As shown in FIG. 8, UE1 may detect a trigger to perform sidelink BWP switching from a first sidelink BWP for UE1 (UE1 BWP1) to a second sidelink BWP for UE1 (UE1 BWP2). UE1 BWP1 may be configured with a first Tx resource pool (SL Tx Pool 1) and a second Tx resource pool (SL Tx Pool 2). An active sidelink BWP for UE2 (UE2 BWP1) may be configured with a first Rx resource pool (SL Rx Pool 1), a second Rx resource pool (SL Rx Pool 2), and a third Rx resource pool (SL Rx Pool 3). As shown by reference number 805, SL Tx Pool 1 in UE1 BWP1 overlaps with SL Rx Pool 1 in UE2 BWP1. Accordingly, in a case in which UE1 transmits a sidelink communication using SL Tx Pool 1 in UE1 BWP1, UE2 may receive the sidelink communication in SL Rx Pool 1 in UE2 BWP1. As shown by reference number 810, a first Tx resource pool (SL Tx Pool 1) configured in UE1 BWP2 overlaps with SL Rx Pool 2 in UE2 BWP1 (e.g., in the active sidelink BWP of UE2). Accordingly, in a case in which UE1 transmits a sidelink communication using SL Tx Pool 1 in UE1 BWP2, UE2 may receive the sidelink communication in SL Rx Pool 2 in UE2 BWP1.

In some aspects, UE1 may be aware of the BWP and Rx resource pool information for UE2. For example, UE1 may know that UE1 BWP2 has a Tx resource pool that overlaps with an Rx resource pool in the active sidelink BWP of UE2 (UE2 BWP1). In this case, no coordination from UE2 may be needed for UE1 to switch the active sidelink BWP from UE1 BWP1 to UE1 BWP2. For example, UE1 may switch the active sidelink BWP from UE1 BWP1 to UE1 BWP2 without any signaling between UE1 and UE2, as UE2 does not need to know that UE1 has switched the active sidelink BWP to receive the sidelink communications transmitted in the new sidelink BWP (UE1 BWP2). In some aspects, UE1 may request, from UE2 congestion levels in the Tx resource pools to be used for transmitting sidelink communications to UE2, and UE1 may determine whether to switch between UE1 BWP1 and UE1 BWP2 based at least in part on the congestion levels. In this case, the BWP switching delay may be a certain time offset after UE1 triggers a sidelink BWP switch.

As indicated above, FIG. 8 is provided as an example. Other examples may differ from what is described with respect to FIG. 8.

Figure 9:
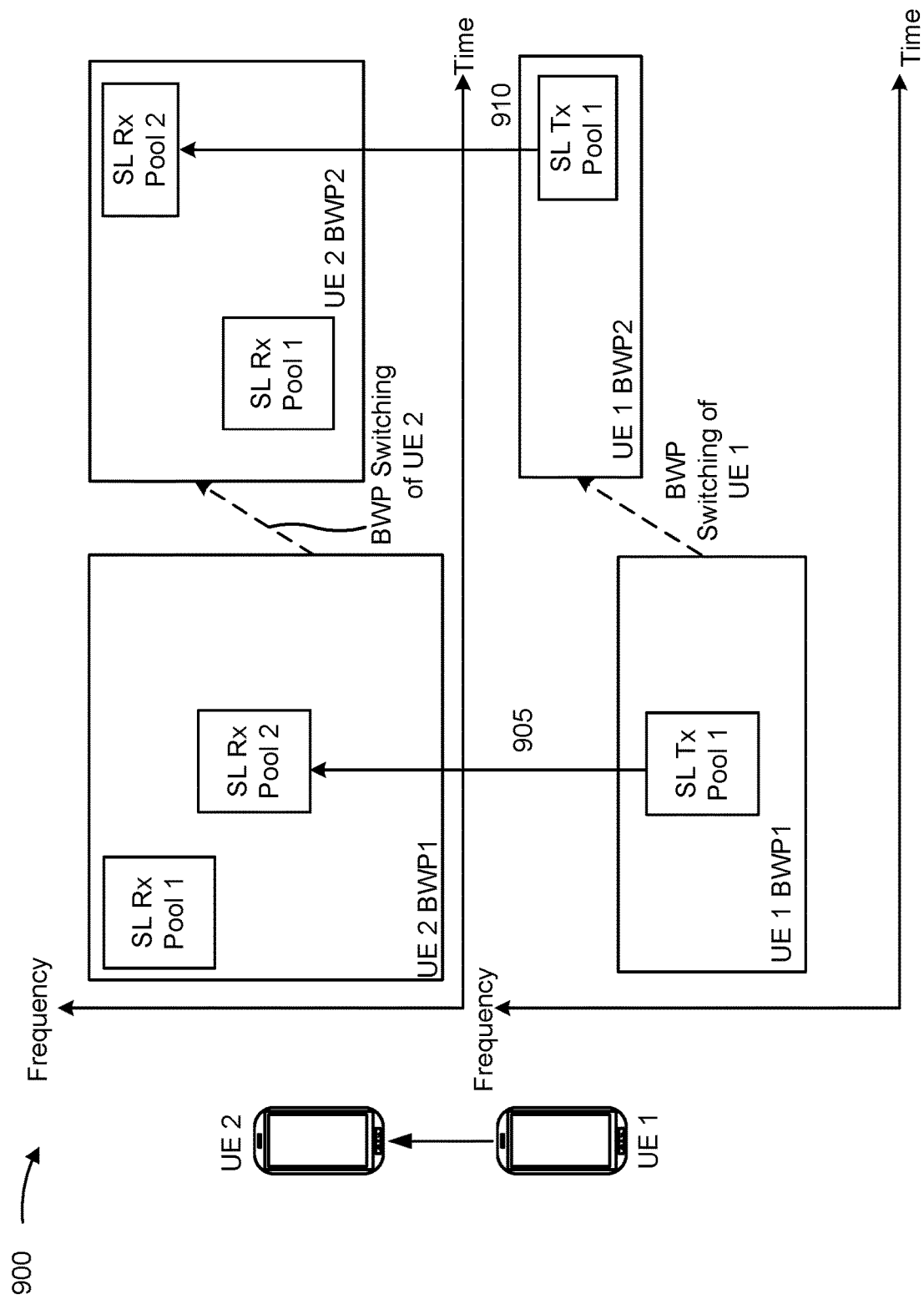

FIG. 9 is a diagram illustrating an example 900 associated with sidelink BWP switching, in accordance with the present disclosure. As shown in FIG. 9, example 900 includes communication between a first UE (UE1) and a second UE (UE2). UE1 may be a Tx UE and UE2 may be an Rx UE.

As shown in FIG. 9, a first sidelink BWP for UE1 (UE1 BWP1) may be configured with a first Tx resource pool (SL Tx Pool 1). A first sidelink BWP for UE2 (UE2 BWP1) may be configured with a first Rx resource pool (SL Rx Pool 1) and a second Rx resource pool (SL Rx Pool 2). As shown by reference number 905, SL Tx Pool 1 in UE1 BWP1 overlaps with SL Rx Pool 2 in UE2 BWP1. Accordingly, in a case in which UE1 transmits a sidelink communication using SL Tx Pool 1 in UE1 BWP1, UE2 may receive the sidelink communication in SL Rx Pool 2 in UE2 BWP1.

In some aspects, UE1 may detect a trigger to perform sidelink BWP switching from UE1 BWP1 to a second sidelink BWP for UE1 (UE1 BWP2). In this case, UE1 may not know whether there is an Rx resource pool in the current active sidelink BWP for UE2 (UE2 BWP1) that overlaps with any Tx resource pool in UE1 BWP2. In this case, UE1 may transmit a Msg 1 to UE2 to indicate the sidelink BWP switch, for UE1, to UE1 BWP2. The Msg 1 may also indicate a first Tx resource pool (SL Tx Pool 1) in UE1 BWP2. UE2 may then select a new sidelink BWP (UE2 BWP 2) that has a configured Rx resource pool (SL Rx Pool 2) in UE2 BWP2 that overlaps with SL Tx Pool 1 in UE1 BWP2. In this case, UE2 may transmit, to UE1, a Msg 2 confirming the sidelink BWP switch and including information identifying the new sidelink BWP for UE2 (UE2 BWP2) and the SL Rx Pool 2 in UE2 BWP 2. UE1 may transmit a Msg 3 to activate the sidelink BWP switching for UE1 and UE2. As shown by reference number 910, after the sidelink BWP switching for UE1 and UE2, UE1 may transmit a sidelink communication using SL Tx Pool 1 in UE1 BWP2, and UE2 may receive the sidelink communication in SL Rx Pool 2 in UE2 BWP2.

As indicated above, FIG. 9 is provided as an example. Other examples may differ from what is described with respect to FIG. 9.

Figure 10:
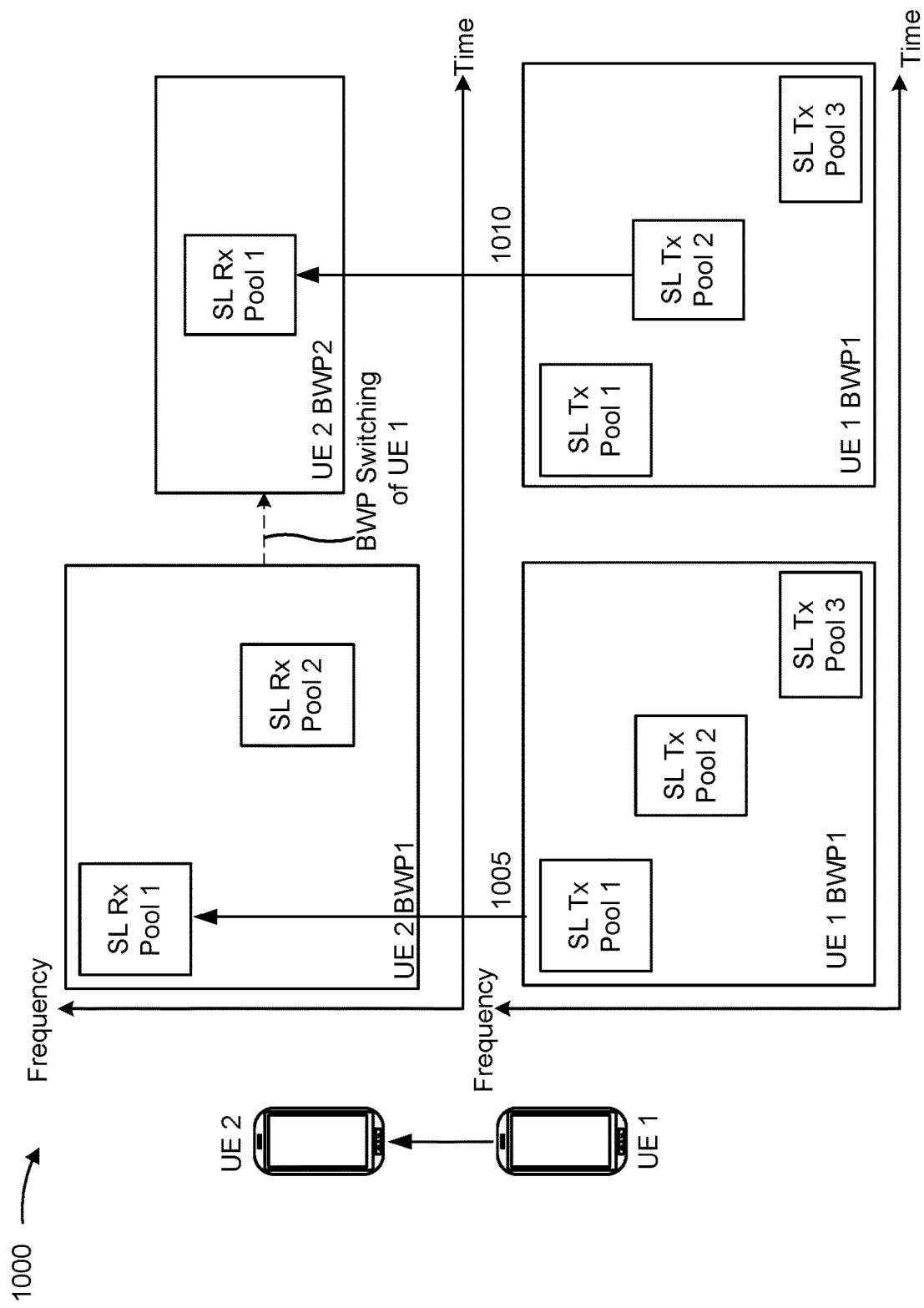

FIG. 10 is a diagram illustrating an example 1000 associated with sidelink BWP switching, in accordance with the present disclosure. As shown in FIG. 10, example 1000 includes communication between a first UE (UE1) and a second UE (UE2). UE1 may be a Tx UE and UE2 may be an Rx UE.

As shown in FIG. 10, an active sidelink BWP for UE1 (UE1 BWP1) may be configured with a first Tx resource pool (SL Tx Pool 1), a second Tx resource pool (SL Tx Pool 2), and a third Tx resource pool (SL Tx Pool 3). A first sidelink BWP for UE2 (UE2 BWP1) may be configured with a first Rx resource pool (SL Rx Pool 1) and a second Rx resource pool (SL Rx Pool 2). As shown by reference number 1005, SL Tx Pool 1 in UE1 BWP1 overlaps with SL Rx Pool 1 in UE2 BWP1. Accordingly, in a case in which UE1 transmits a sidelink communication using SL Tx Pool 1 in UE1 BWP1, UE2 may receive the sidelink communication in SL Rx Pool 1 in UE2 BWP1.

In some aspects, UE2 may detect a trigger to perform sidelink BWP switching from UE2 BWP1 to a second sidelink BWP for UE2 (UE2 BWP2). As shown in FIG. 10, a first Rx resource pool (SL Rx Pool 1) in UE2 BWP2 overlaps with SL Tx Pool 2 in the active BWP for UE1 (UE1 BWP1). In this case, UE2 may transmit a Msg 1 to UE1 to indicate the sidelink BWP switch, for UE2, to UE2 BWP2. The Msg 1 may also include information identifying SL Rx Pool 1 in UE2 BWP2. UE1 may then determine to use SL Tx Pool 2 in UE1 BWP1 to transmit sidelink communications to UE2. In this case, UE1 may not need to switch the active BWP for UE1. UE1 may transmit, to UE2, a Msg 2 confirming the sidelink BWP switch for UE2. UE2 may transmit a Msg 3 to activate the sidelink BWP switching for UE2. In this case, UE1 may begin using SL Tx Pool 1 in UE1 BWP1 at the same time UE2 switches to UE2 BWP2. As shown by reference number 1010, after the sidelink BWP switching for UE2, UE1 may transmit a sidelink communication using SL Tx Pool 2 in UE1 BWP1, and UE2 may receive the sidelink communication in SL Rx Pool 1 in UE2 BWP2.

As indicated above, FIG. 10 is provided as an example. Other examples may differ from what is described with respect to FIG. 10.

Figure 11:
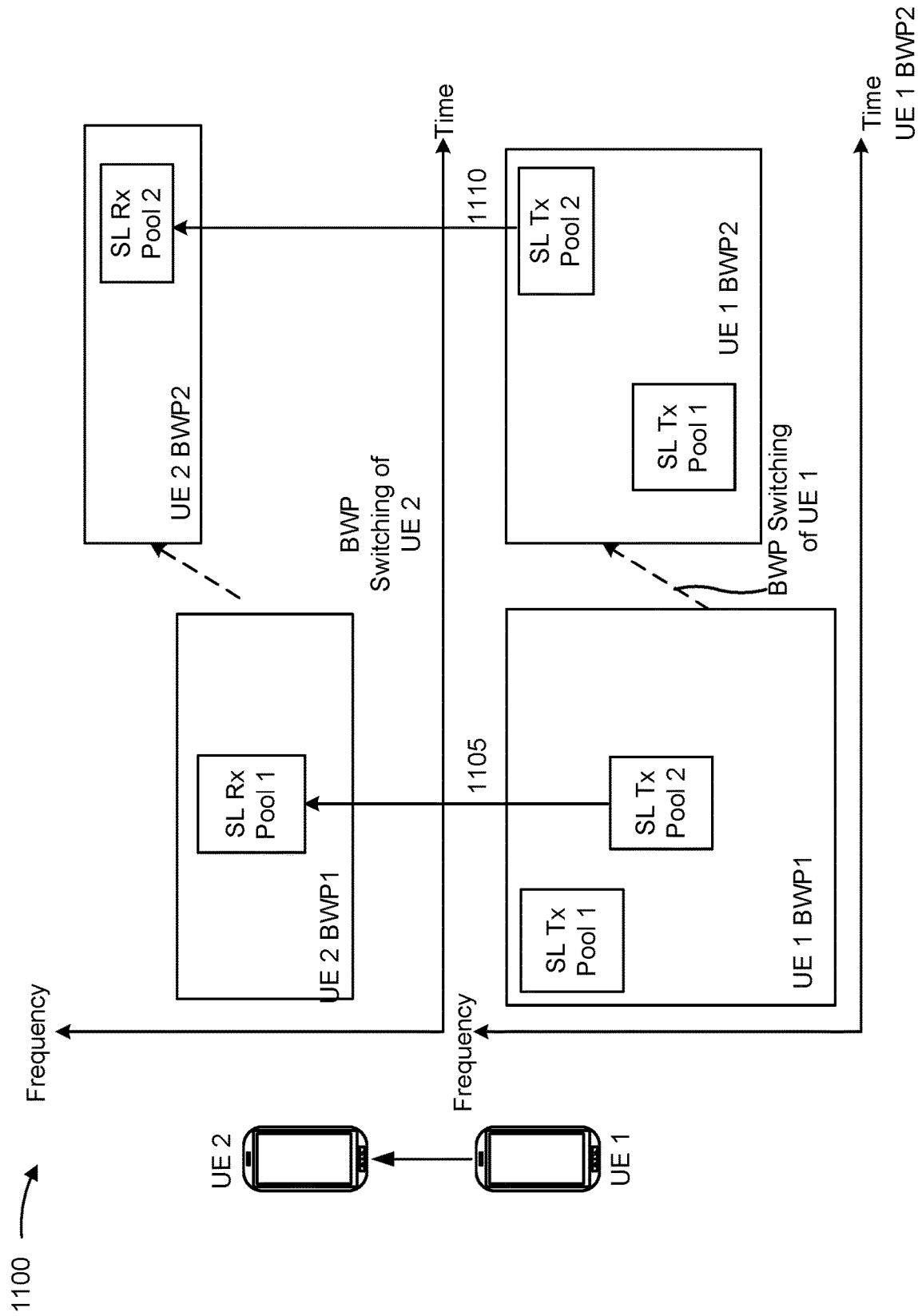

FIG. 11 is a diagram illustrating an example 1100 associated with sidelink BWP switching, in accordance with the present disclosure. As shown in FIG. 11, example 1100 includes communication between a first UE (UE1) and a second UE (UE2). UE1 may be a Tx UE and UE2 may be an Rx UE.

As shown in FIG. 11, a first sidelink BWP for UE1 (UE1 BWP1) may be configured with a first Tx resource pool (SL Tx Pool 1) and a second Tx resource pool (SL Tx Pool 2). A first sidelink BWP for UE2 (UE2 BWP1) may be configured with a first Rx resource pool (SL Rx Pool 1). As shown by reference number 1105, SL Tx Pool 2 in UE1 BWP1 overlaps with SL Rx Pool 1 in UE2 BWP1. Accordingly, in a case in which UE1 transmits a sidelink communication using SL Tx Pool 2 in UE1 BWP1, UE2 may receive the sidelink communication in SL Rx Pool 1 in UE2 BWP1.

In some aspects, UE2 may detect a trigger to perform sidelink BWP switching from UE2 BWP1 to a second sidelink BWP for UE2 (UE2 BWP2). UE2 BWP 2 may have no Rx resource pool that overlaps with a Tx resource pool in the current active sidelink BWP for UE1 (UE1 BWP1). In this case, UE2 may transmit a Msg 1 to UE1 to indicate the sidelink BWP switch, for UE2, to UE2 BWP2. The Msg 1 may also indicate include information identifying a first Rx resource pool (SL Rx Pool 1) in UE2 BWP2. UE1 may then select a new sidelink BWP (UE1 BWP 2) that has a configured Tx resource pool (SL Tx Pool 2) in UE1 BWP2 that overlaps with SL Rx Pool 1 in UE2 BWP2. In this case, UE1 may transmit, to UE2, a Msg 2 confirming the sidelink BWP switch for UE2 and including information identifying the new sidelink BWP for UE1 (UE1 BWP2) and SL Tx Pool 2 in UE1 BWP 2. UE2 may transmit a Msg 3 to activate the sidelink BWP switching for UE1 and UE2. As shown by reference number 1110, after the sidelink BWP switching for UE1 and UE2, UE1 may transmit a sidelink communication using SL Tx Pool 2 in UE1 BWP2, and UE2 may receive the sidelink communication in SL Rx Pool 1 in UE2 BWP2.

As indicated above, FIG. 11 is provided as an example. Other examples may differ from what is described with respect to FIG. 11.

Figure 12:
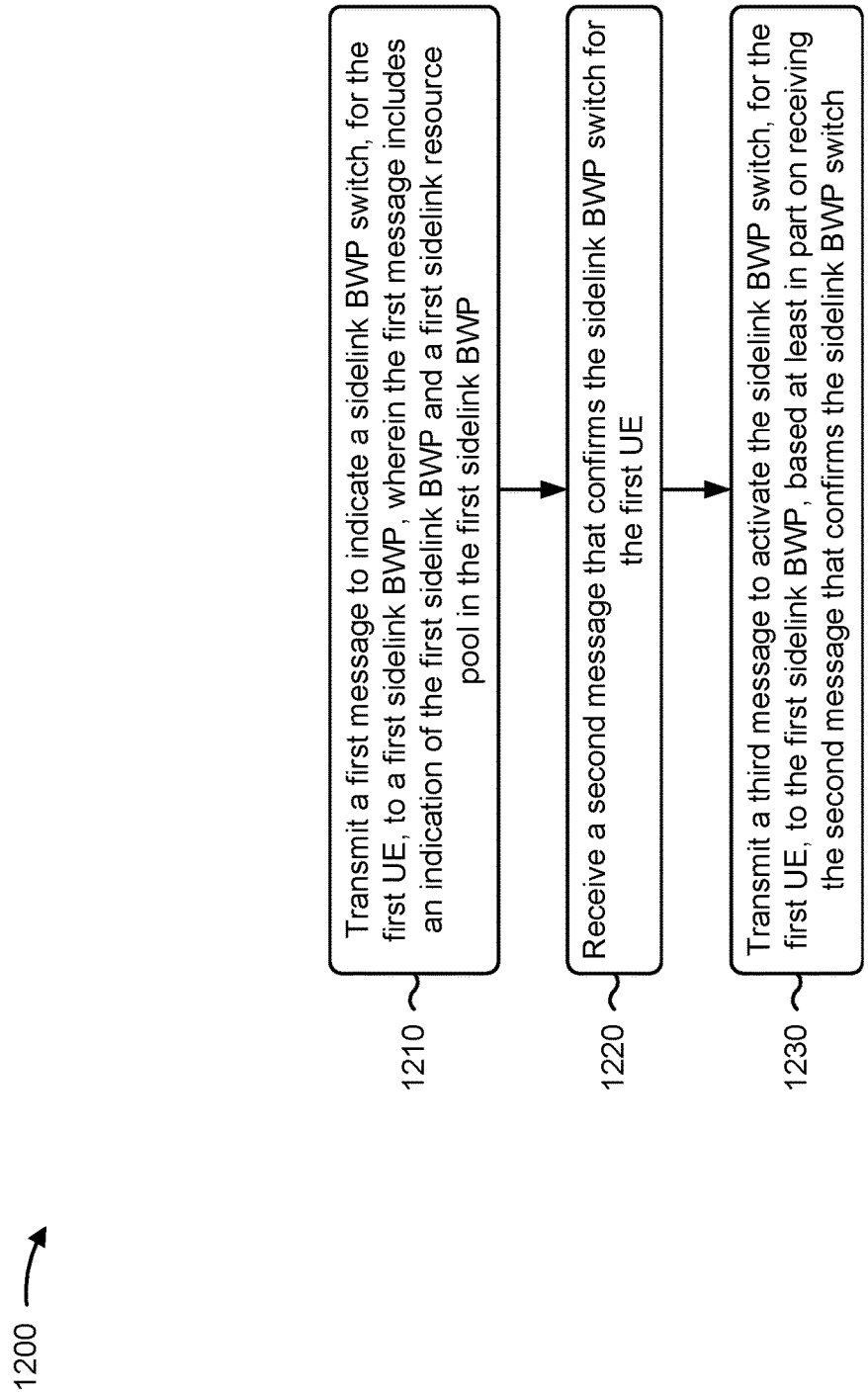
FIGS. 12-13 are diagrams illustrating example processes associated with sidelink BWP switching, in accordance with the present disclosure.

FIG. 12 is a diagram illustrating an example process 1200 performed, for example, by a first UE, in accordance with the present disclosure. Example process 1200 is an example where the UE (e.g., UE 120) performs operations associated with sidelink BWP switching.

As shown in FIG. 12, in some aspects, process 1200 may include transmitting, to a second UE, a first message to indicate a sidelink BWP switch, for the first UE, to a first sidelink BWP, wherein the first message includes an indication of the first sidelink BWP and a first sidelink resource pool in the first sidelink BWP (block 1210). For example, the UE (e.g., using communication manager 140 and/or transmission component 1404, depicted in FIG. 14) may transmit, to a second UE, a first message to indicate a sidelink BWP switch, for the first UE, to a first sidelink BWP, wherein the first message includes an indication of the first sidelink BWP and a first sidelink resource pool in the first sidelink BWP, as described above.

As further shown in FIG. 12, in some aspects, process 1200 may include receiving, from the second UE, a second message that confirms the sidelink BWP switch for the first UE (block 1220). For example, the UE (e.g., using communication manager 140 and/or reception component 1402, depicted in FIG. 14) may receive, from the second UE, a second message that confirms the sidelink BWP switch for the first UE, as described above.

As further shown in FIG. 12, in some aspects, process 1200 may include transmitting, to the second UE, a third message to activate the sidelink BWP switch, for the first UE, to the first sidelink BWP, based at least in part on receiving the second message that confirms the sidelink BWP switch (block 1230). For example, the UE (e.g., using communication manager 140 and/or transmission component 1404, depicted in FIG. 14) may transmit, to the second UE, a third message to activate the sidelink BWP switch, for the first UE, to the first sidelink BWP, based at least in part on receiving the second message that confirms the sidelink BWP switch, as described above.

Process 1200 may include additional aspects, such as any single aspect or any combination of aspects described below and/or in connection with one or more other processes described elsewhere herein.

In a first aspect, process 1200 includes switching to the first sidelink BWP after a BWP switching time duration from the third message and communicating with the second UE using the first sidelink resource pool in the first sidelink BWP.

In a second aspect, alone or in combination with the first aspect, communicating with the second UE includes transmitting, to the second UE, a sidelink communication using the first sidelink resource pool in the first sidelink BWP.

In a third aspect, alone or in combination with one or more of the first and second aspects, communicating with the second UE includes receiving, from the second UE, a sidelink communication using the first sidelink resource pool in the first sidelink BWP.

In a fourth aspect, alone or in combination with one or more of the first through third aspects, the third message activates the sidelink BWP switch, for the first UE, to the first sidelink BWP that includes the first sidelink resource pool, and the third message activates a sidelink BWP switch, for the second UE, to a second sidelink BWP that includes a second sidelink resource pool that matches with the first sidelink resource pool.

In a fifth aspect, alone or in combination with one or more of the first through fourth aspects, the third message activates the sidelink BWP switch, for the first UE, to the first sidelink BWP and the sidelink BWP switch, for the second UE, to the second sidelink BWP, after a BWP switching time duration from the third message.

In a sixth aspect, alone or in combination with one or more of the first through fifth aspects, the second message includes an indication of the second sidelink BWP and the second sidelink resource pool in the second sidelink BWP.

In a seventh aspect, alone or in combination with one or more of the first through sixth aspects, the second message is a PSFCH message that includes an ACK that confirms the sidelink BWP switch for the first UE.

In an eighth aspect, alone or in combination with one or more of the first through seventh aspects, transmitting the first message includes transmitting the first message to a plurality of wireless network devices including the second UE, and receiving the second message includes receiving, from each of the plurality of wireless network devices, a respective second message that that confirms the sidelink BWP switch for the first UE or does not confirm the sidelink BWP switch for the first UE.

In a ninth aspect, alone or in combination with one or more of the first through eighth aspects, transmitting the third message includes transmitting the third message based at least in part on the respective second message, received from at least one wireless network device of the plurality of wireless network devices, confirming the sidelink BWP switch for the first UE.

In a tenth aspect, alone or in combination with one or more of the first through ninth aspects, transmitting the third message includes transmitting the third message based at least in part on the respective second message, received from each wireless network device of the plurality of wireless network devices, confirming the sidelink BWP switch for the first UE.

In an eleventh aspect, alone or in combination with one or more of the first through tenth aspects, the plurality of wireless network devices include the second UE and a third UE, the respective second message received from the second UE confirms the sidelink BWP switch for the first UE and the respective second message received from the third UE does not confirm the sidelink BWP switch for the first UE, and transmitting the third message includes transmitting the third message based at least in part on a determination that a priority associated with the respective second message received from the second UE is higher than a priority associated with the respective second message received from the third UE.

In a twelfth aspect, alone or in combination with one or more of the first through eleventh aspects, the plurality of wireless network devices includes a base station.

In a thirteenth aspect, alone or in combination with one or more of the first through twelfth aspects, transmitting the first message includes transmitting the first message to a plurality of UEs including the second UE, and process 1200 includes determining whether a respective second message that that confirms the sidelink BWP switch for the first UE or does not confirm the sidelink BWP switch for the first UE is received from each UE of the plurality of UEs within a time duration from transmitting the first message to the plurality of UEs, and based at least in part on a determination that the respective second message is not received from at least one UE of the plurality of UEs within the time duration from transmitting the first message to the plurality of UEs, determining that the respective second message from the at least one UE does not approve the BWP switch for the first UE, or transmitting the first message to the at least one UE.

In a fourteenth aspect, alone or in combination with one or more of the first through thirteenth aspects, the first message is included in at least one of SCI or a MAC-CE, the second message is included in at least one of SCI, a MAC-CE, or a PSFCH message, and the third message is included in at least one of SCI or a MAC-CE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
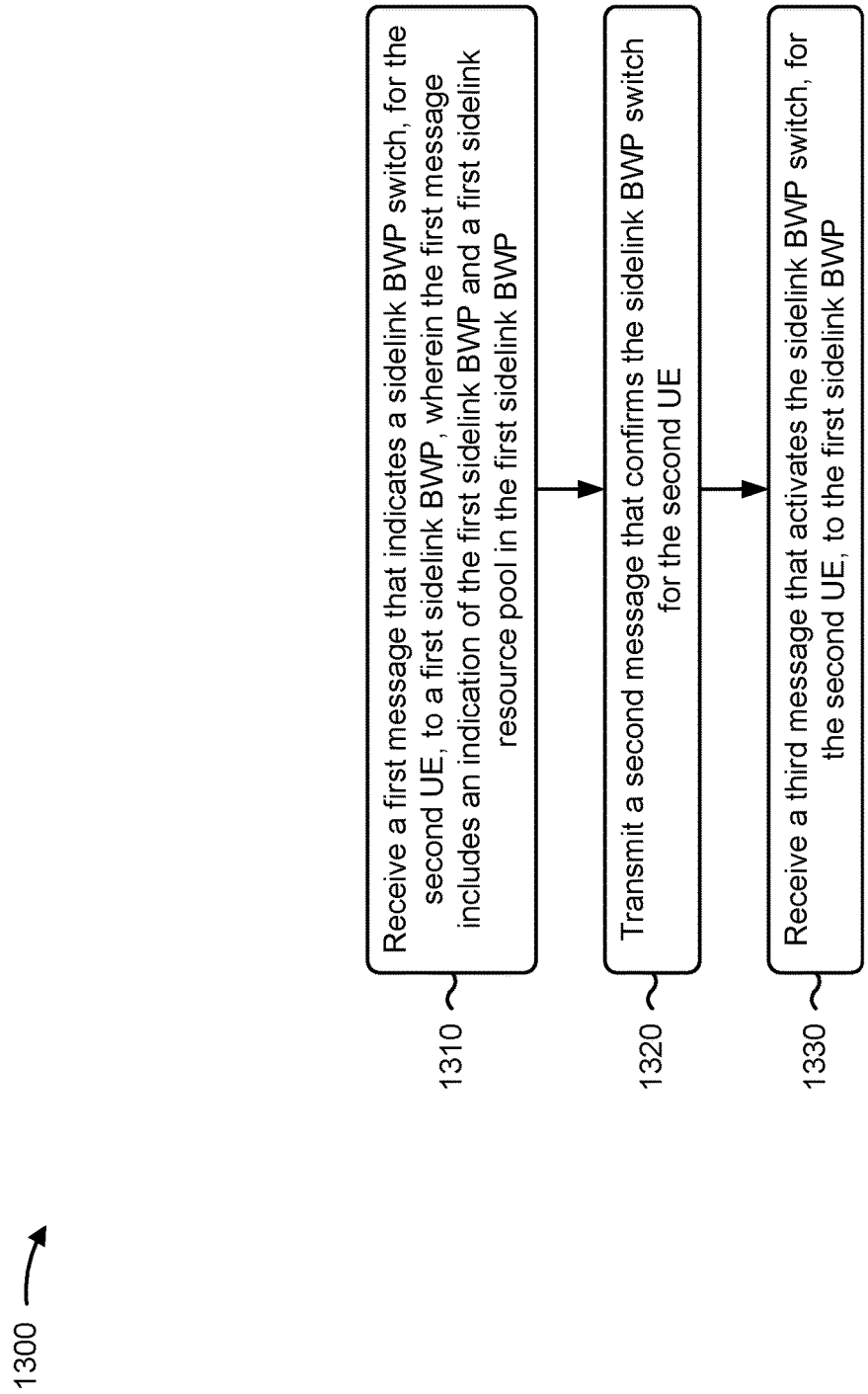

FIG. 13 is a diagram illustrating an example process 1300 performed, for example, by a first UE, in accordance with the present disclosure. Example process 1300 is an example where the UE (e.g., UE 120) performs operations associated with sidelink BWP switching.

As shown in FIG. 13, in some aspects, process 1300 may include receiving, from a second UE, a first message that indicates a sidelink BWP switch, for the second UE, to a first sidelink BWP, wherein the first message includes an indication of the first sidelink BWP and a first sidelink resource pool in the first sidelink BWP (block 1310). For example, the UE (e.g., using communication manager 140 and/or reception component 1402, depicted in FIG. 14) may receive, from a second UE, a first message that indicates a sidelink BWP switch, for the second UE, to a first sidelink BWP, wherein the first message includes an indication of the first sidelink BWP and a first sidelink resource pool in the first sidelink BWP, as described above.

As further shown in FIG. 13, in some aspects, process 1300 may include transmitting, to the second UE, a second message that confirms the sidelink BWP switch for the second UE (block 1320). For example, the UE (e.g., using communication manager 140 and/or transmission component 1404, depicted in FIG. 14) may transmit, to the second UE, a second message that confirms the sidelink BWP switch for the second UE, as described above.

As further shown in FIG. 13, in some aspects, process 1300 may include receiving, from the second UE, a third message that activates the sidelink BWP switch, for the second UE, to the first sidelink BWP (block 1330). For example, the UE (e.g., using communication manager 140 and/or reception component 1402, depicted in FIG. 14) may receive, from the second UE, a third message that activates the sidelink BWP switch, for the second UE, to the first sidelink BWP, as described above.

Process 1300 may include additional aspects, such as any single aspect or any combination of aspects described below and/or in connection with one or more other processes described elsewhere herein.

In a first aspect, process 1300 includes selecting a second sidelink BWP, for a sidelink BWP switch for the first UE, based at least in part on the indication of the first sidelink BWP and the first sidelink resource pool in the first message, and the second sidelink BWP includes a second sidelink resource pool that matches with the first sidelink resource pool.

In a second aspect, alone or in combination with the first aspect, the third message activates the sidelink BWP switch, for the second UE, to the first sidelink BWP, and the third message activates the sidelink BWP switch, for the first UE, to the second sidelink BWP.

In a third aspect, alone or in combination with one or more of the first and second aspects, process 1300 includes switching to the second sidelink BWP after a BWP switching time duration from the third message, and communicating with the first UE using the second sidelink resource pool in the second sidelink BWP.

In a fourth aspect, alone or in combination with one or more of the first through third aspects, communicating with the first UE includes receiving, in the second sidelink resource pool in the second sidelink BWP, a sidelink communication transmitted by the second UE in the first sidelink resource pool in the first sidelink BWP.

In a fifth aspect, alone or in combination with one or more of the first through fourth aspects, communicating with the first UE includes transmitting, to the second UE, a sidelink communication using the second sidelink resource pool in the second sidelink BWP.

In a sixth aspect, alone or in combination with one or more of the first through fifth aspects, the second message includes an indication of the second sidelink BWP and the second sidelink resource pool in the second sidelink BWP.

In a seventh aspect, alone or in combination with one or more of the first through sixth aspects, process 1300 includes transmitting, to a third UE, another first message that indicates the sidelink BWP switch, for the first UE, to the second sidelink BWP and indicates the second resource pool in the second sidelink BWP, receiving, from the third UE, another second message that confirms the sidelink BWP switch for the first UE, and transmitting, to the third UE, another third message that activates the sidelink BWP switch, for the first UE, to the second sidelink BWP.

In an eighth aspect, alone or in combination with one or more of the first through seventh aspects, the second message is a PSFCH message that includes an ACK that confirms the sidelink BWP switch for the first UE.

In a ninth aspect, alone or in combination with one or more of the first through eighth aspects, the first message is included in at least one of SCI or a MAC-CE, the second message is included in at least one of SCI, a MAC-CE, or a PSFCH message, and the third message is included in at least one of SCI or a MAC-CE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
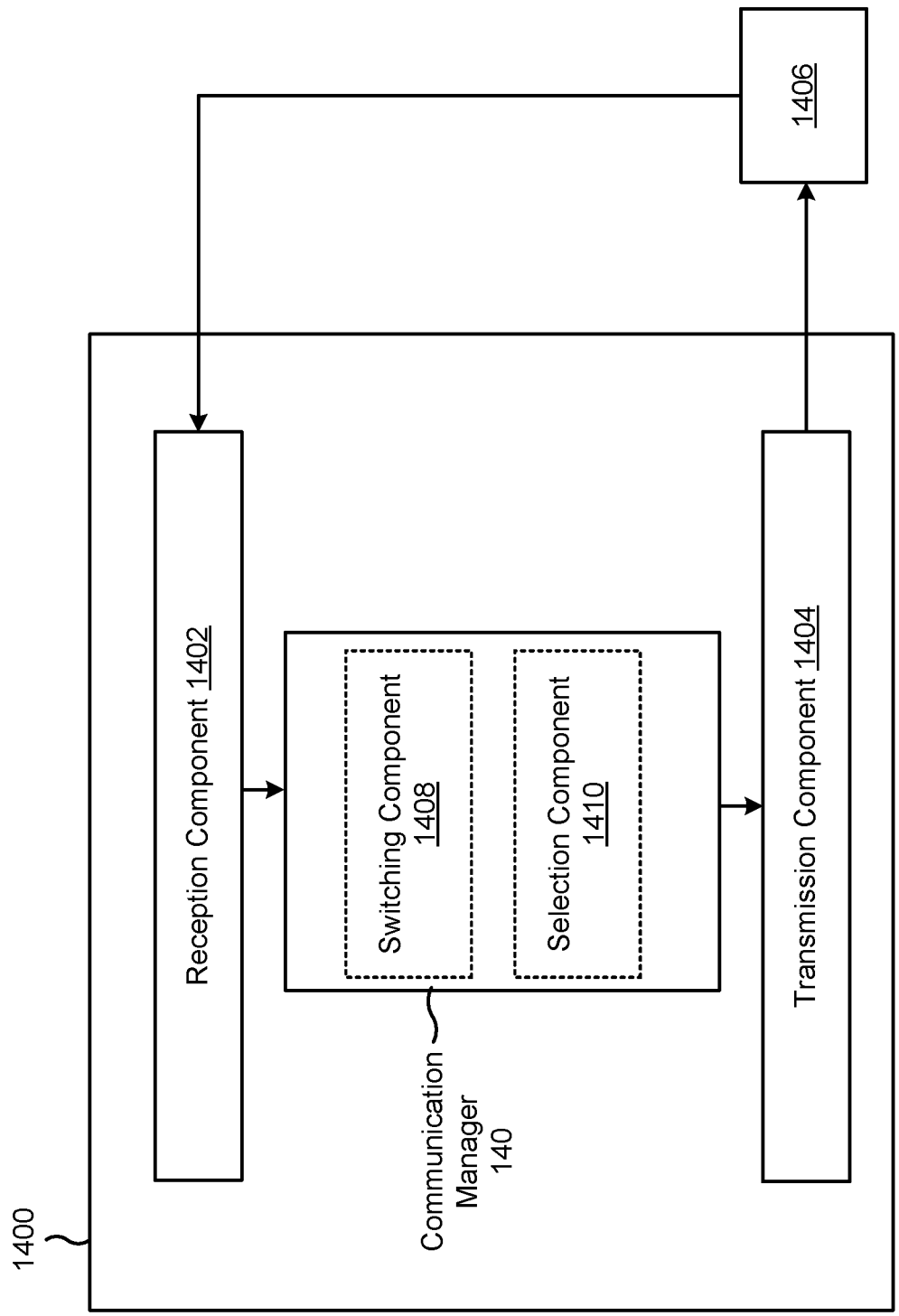
FIG. 14 is a diagram of an example apparatus for wireless communication, in accordance with the present disclosure.

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include one or more of a switching component 1408 or a selection component 1410, among other examples.

In some aspects, the apparatus 1400 may be configured to perform one or more operations described herein in connection with FIGS. 6-11. Additionally, or alternatively, the apparatus 1400 may be configured to perform one or more processes described herein, such as process 1200 of FIG. 12, process 1300 of FIG. 13, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The transmission component 1404 may transmit, to a second UE, a first message to indicate a sidelink BWP switch, for the first UE, to a first sidelink BWP, wherein the first message includes an indication of the first sidelink BWP and a first sidelink resource pool in the first sidelink BWP. The reception component 1402 may receive, from the second UE, a second message that confirms the sidelink BWP switch for the first UE. The transmission component 1404 may transmit, to the second UE, a third message to activate the sidelink BWP switch, for the first UE, to the first sidelink BWP, based at least in part on receiving the second message that confirms the sidelink BWP switch.

The switching component 1408 may switch to the first sidelink BWP after a BWP switching time duration from the third message.

The reception component 1402 and/or the transmission component 1404 may communicate with the second UE using the first sidelink resource pool in the first sidelink BWP.

The reception component 1402 may receive, from a second UE, a first message that indicates a sidelink BWP switch, for the second UE, to a first sidelink BWP, wherein the first message includes an indication of the first sidelink BWP and a first sidelink resource pool in the first sidelink BWP. The transmission component 1404 may transmit, to the second UE, a second message that confirms the sidelink BWP switch for the second UE. The reception component 1402 may receive, from the second UE, a third message that activates the sidelink BWP switch, for the second UE, to the first sidelink BWP.

The selection component 1410 may select a second sidelink BWP, for a sidelink BWP switch for the first UE, based at least in part on the indication of the first sidelink BWP and the first sidelink resource pool in the first message, wherein the second sidelink BWP includes a second sidelink resource pool that matches with the first sidelink resource pool.

The switching component 1408 may switch to the second sidelink BWP after a BWP switching time duration from the third message.

The reception component 1402 and/or the transmission component 1404 may communicate with the first UE using the second sidelink resource pool in the second sidelink BWP.

The transmission component 1404 may transmit, to a third UE, another first message that indicates the sidelink BWP switch, for the first UE, to the second sidelink BWP and indicates the second resource pool in the second sidelink BWP.

The reception component 1402 may receive, from the third UE, another second message that confirms the sidelink BWP switch for the first UE.

The transmission component 1404 may transmit, to the third UE, another third message that activates the sidelink BWP switch, for the first UE, to the second sidelink BWP.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a first user equipment (UE), comprising: transmitting, to a second UE, a first message to indicate a sidelink bandwidth part (BWP) switch, for the first UE, to a first sidelink BWP, wherein the first message includes an indication of the first sidelink BWP and a first sidelink resource pool in the first sidelink BWP; receiving, from the second UE, a second message that confirms the sidelink BWP switch for the first UE; and transmitting, to the second UE, a third message to activate the sidelink BWP switch, for the first UE, to the first sidelink BWP, based at least in part on receiving the second message that confirms the sidelink BWP switch.

Aspect 2: The method of Aspect 1, further comprising: switching to the first sidelink BWP after a BWP switching time duration from the third message; and communicating with the second UE using the first sidelink resource pool in the first sidelink BWP.

Aspect 3: The method of Aspect 2, wherein communicating with the second UE comprises: transmitting, to the second UE, a sidelink communication using the first sidelink resource pool in the first sidelink BWP.

Aspect 4: The method of any of Aspects 2-3, wherein communicating with the second UE comprises: receiving, from the second UE, a sidelink communication using the first sidelink resource pool in the first sidelink BWP.

Aspect 5: The method of any of Aspects 1-4, wherein the third message activates the sidelink BWP switch, for the first UE, to the first sidelink BWP that includes the first sidelink resource pool, and the third message activates a sidelink BWP switch, for the second UE, to a second sidelink BWP that includes a second sidelink resource pool that matches with the first sidelink resource pool.

Aspect 6: The method of Aspect 5, wherein the third message activates the sidelink BWP switch, for the first UE, to the first sidelink BWP and the sidelink BWP switch, for the second UE, to the second sidelink BWP, after a BWP switching time duration from the third message.

Aspect 7: The method of any of Aspects 5-6, wherein the second message includes an indication of the second sidelink BWP and the second sidelink resource pool in the second sidelink BWP.

Aspect 8: The method of any of Aspects 1-7, wherein the second message is a physical sidelink feedback channel (PSFCH) message that includes an acknowledgement (ACK) that confirms the sidelink BWP switch for the first UE.

Aspect 9: The method of any of Aspects 1-8, wherein transmitting the first message comprises transmitting the first message to a plurality of wireless network devices including the second UE, and wherein receiving the second message comprises: receiving, from each of the plurality of wireless network devices, a respective second message that that confirms the sidelink BWP switch for the first UE or does not confirm the sidelink BWP switch for the first UE.

Aspect 10: The method of Aspect 9, wherein transmitting the third message comprises: transmitting the third message based at least in part on the respective second message, received from at least one wireless network device of the plurality of wireless network devices, confirming the sidelink BWP switch for the first UE.

Aspect 11: The method of Aspect 9, wherein transmitting the third message comprises: transmitting the third message based at least in part on the respective second message, received from each wireless network device of the plurality of wireless network devices, confirming the sidelink BWP switch for the first UE.

Aspect 12: The method of Aspect 9, wherein the plurality of wireless network devices include the second UE and a third UE, wherein the respective second message received from the second UE confirms the sidelink BWP switch for the first UE and the respective second message received from the third UE does not confirm the sidelink BWP switch for the first UE, and wherein transmitting the third message comprises: transmitting the third message based at least in part on a determination that a priority associated with the respective second message received from the second UE is higher than a priority associated with the respective second message received from the third UE.

Aspect 13: The method of any of Aspects 9-12, wherein the plurality of wireless network devices includes a base station.

Aspect 14: The method of any of Aspects 1-13, wherein transmitting the first message comprises transmitting the first message to a plurality of UEs including the second UE, and wherein the method further comprises: determining whether a respective second message that confirms the sidelink BWP switch for the first UE or does not confirm the sidelink BWP switch for the first UE is received from each UE of the plurality of UEs within a time duration from transmitting the first message to the plurality of UEs; and based at least in part on a determination that the respective second message is not received from at least one UE of the plurality of UEs within the time duration from transmitting the first message to the plurality of UEs, determining that the respective second message from the at least one UE does not approve the BWP switch for the first UE, or re-transmitting the first message to the at least one UE.

Aspect 15: The method of any of Aspects 1-14, wherein the first message is included in at least one of sidelink control information (SCI) or a medium access control (MAC) control element (MAC-CE), wherein the second message is included in at least one of SCI, a MAC-CE, or a physical sidelink feedback channel (PSFCH) message, and wherein the third message is included in at least one of SCI or a MAC-CE.

Aspect 16: A method of wireless communication performed by a first user equipment (UE), comprising: receiving, from a second UE, a first message that indicates a sidelink bandwidth part (BWP) switch, for the second UE, to a first sidelink BWP, wherein the first message includes an indication of the first sidelink BWP and a first sidelink resource pool in the first sidelink BWP; transmitting, to the second UE, a second message that confirms the sidelink BWP switch for the second UE; and receiving, from the second UE, a third message that activates the sidelink BWP switch, for the second UE, to the first sidelink BWP.

Aspect 17: The method of Aspect 16, further comprising: selecting a second sidelink BWP, for a sidelink BWP switch for the first UE, based at least in part on the indication of the first sidelink BWP and the first sidelink resource pool in the first message, wherein the second sidelink BWP includes a second sidelink resource pool that matches with the first sidelink resource pool.

Aspect 18: The method of Aspect 17, wherein the third message activates the sidelink BWP switch, for the second UE, to the first sidelink BWP, and the third message activates the sidelink BWP switch, for the first UE, to the second sidelink BWP.

Aspect 19: The method of Aspect 18, further comprising: switching to the second sidelink BWP after a BWP switching time duration from the third message; and communicating with the first UE using the second sidelink resource pool in the second sidelink BWP.

Aspect 20: The method of Aspect 19, wherein communicating with the first UE comprises: receiving, in the second sidelink resource pool in the second sidelink BWP, a sidelink communication transmitted by the second UE in the first sidelink resource pool in the first sidelink BWP.

Aspect 21: The method of any of Aspects 19-20, wherein communicating with the first UE comprises: transmitting, to the second UE, a sidelink communication using the second sidelink resource pool in the second sidelink BWP.

Aspect 22: The method of any of Aspects 17-21, wherein the second message includes an indication of the second sidelink BWP and the second sidelink resource pool in the second sidelink BWP.

Aspect 23: The method of any of Aspects 17-22, further comprising: transmitting, to a third UE, another first message that indicates the sidelink BWP switch, for the first UE, to the second sidelink BWP and indicates the second resource pool in the second sidelink BWP; receiving, from the third UE, another second message that confirms the sidelink BWP switch for the first UE; and transmitting, to the third UE, another third message that activates the sidelink BWP switch, for the first UE, to the second sidelink BWP.

Aspect 24: The method of any of Aspects 16-23, wherein the second message is a physical sidelink feedback channel (PSFCH) message that includes an acknowledgement (ACK) that confirms the sidelink BWP switch for the first UE.

Aspect 25: The method of any of Aspects 16-24, wherein the first message is included in at least one of sidelink control information (SCI) or a medium access control (MAC) control element (MAC-CE), wherein the second message is included in at least one of SCI, a MAC-CE, or a physical sidelink feedback channel (PSFCH) message, and wherein the third message is included in at least one of SCI or a MAC-CE.

Aspect 26: An apparatus for wireless communication at a device, comprising a processor; memory coupled with the processor; and instructions stored in the memory and executable by the processor to cause the apparatus to perform the method of one or more of Aspects 1-15.

Aspect 27: An apparatus for wireless communication at a device, comprising a processor; memory coupled with the processor; and instructions stored in the memory and executable by the processor to cause the apparatus to perform the method of one or more of Aspects 16-25.

Aspect 28: A device for wireless communication, comprising a memory and one or more processors coupled to the memory, the one or more processors configured to perform the method of one or more of Aspects 1-15.

Aspect 29: A device for wireless communication, comprising a memory and one or more processors coupled to the memory, the one or more processors configured to perform the method of one or more of Aspects 16-25.

Aspect 30: An apparatus for wireless communication, comprising at least one means for performing the method of one or more of Aspects 1-15.

Aspect 31: An apparatus for wireless communication, comprising at least one means for performing the method of one or more of Aspects 16-25.

Aspect 32: A non-transitory computer-readable medium storing code for wireless communication, the code comprising instructions executable by a processor to perform the method of one or more of Aspects 1-15.

Aspect 33: A non-transitory computer-readable medium storing code for wireless communication, the code comprising instructions executable by a processor to perform the method of one or more of Aspects 16-25.

Aspect 34: A non-transitory computer-readable medium storing a set of instructions for wireless communication, the set of instructions comprising one or more instructions that, when executed by one or more processors of a device, cause the device to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 16-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   transmitting, to a second UE, a first message to indicate a sidelink bandwidth part (BWP) switch, for the first UE, to a first sidelink BWP, wherein the first message includes an indication of the first sidelink BWP and a first sidelink resource pool in the first sidelink BWP;
   receiving, from the second UE, a second message that confirms the sidelink BWP switch for the first UE; and transmitting, to the second UE, a third message to activate the sidelink BWP switch, for the first UE, to the first sidelink BWP, based at least in part on receiving the second message that confirms the sidelink BWP switch, wherein the third message activates the sidelink BWP switch, for the first UE, to the first sidelink BWP that includes the first sidelink resource pool, and the third message activates a sidelink BWP switch, for the second UE, to a second sidelink BWP that includes a second sidelink resource pool that matches with the first sidelink resource pool.

2. The method of claim 1, further comprising:
switching to the first sidelink BWP after a BWP switching time duration from the third message; and
communicating with the second UE using the first sidelink resource pool in the first sidelink BWP.

3. The method of claim 2, wherein communicating with the second UE comprises at least one of:
transmitting, to the second UE, a sidelink communication using the first sidelink resource pool in the first sidelink BWP; or
receiving, from the second UE, a sidelink communication using the first sidelink resource pool in the first sidelink BWP.

4. The method of claim 1, wherein the third message activates the sidelink BWP switch, for the first UE, to the first sidelink BWP and the sidelink BWP switch, for the second UE, to the second sidelink BWP, after a BWP switching time duration from the third message.

5. The method of claim 1, wherein the second message includes an indication of the second sidelink BWP and the second sidelink resource pool in the second sidelink BWP.

6. The method of claim 1, wherein the second message is a physical sidelink feedback channel (PSFCH) message that includes an acknowledgement (ACK) that confirms the sidelink BWP switch for the first UE.

7. The method of claim 1, wherein transmitting the first message comprises transmitting the first message to a plurality of wireless network devices including the second UE, and wherein receiving the second message comprises:
receiving, from each of the plurality of wireless network devices, a respective second message that confirms the sidelink BWP switch for the first UE or does not confirm the sidelink BWP switch for the first UE.

8. The method of claim 7, wherein transmitting the third message comprises:
transmitting the third message based at least in part on the respective second message, received from at least one wireless network device of the plurality of wireless network devices, confirming the sidelink BWP switch for the first UE.

9. The method of claim 8, wherein the plurality of wireless network devices include the second UE and a third UE, wherein the respective second message received from the second UE confirms the sidelink BWP switch for the first UE and the respective second message received from the third UE does not confirm the sidelink BWP switch for the first UE, and wherein transmitting the third message comprises:
transmitting the third message based at least in part on a determination that a priority associated with the respective second message received from the second UE is higher than a priority associated with the respective second message received from the third UE.

10. The method of claim 1, wherein transmitting the first message comprises transmitting the first message to a plurality of UEs including the second UE, and wherein the method further comprises:
determining whether a respective second message that that confirms the sidelink BWP switch for the first UE or does not confirm the sidelink BWP switch for the first UE is received from each UE of the plurality of UEs within a time duration from transmitting the first message to the plurality of UEs; and
based at least in part on a determination that the respective second message is not received from at least one UE of the plurality of UEs within the time duration from transmitting the first message to the plurality of UEs,
determining that the respective second message from the at least one UE does not approve the BWP switch for the first UE, or
re-transmitting the first message to the at least one UE.

11. A first user equipment (UE) for wireless communication, comprising:
one or more memories; and
one or more processors, coupled to the one or more memories, configured to:
transmit, to a second UE, a first message to indicate a sidelink bandwidth part (BWP) switch, for the first UE, to a first sidelink BWP, wherein the first message includes an indication of the first sidelink BWP and a first sidelink resource pool in the first sidelink BWP;
receive, from the second UE, a second message that confirms the sidelink BWP switch for the first UE; and
transmit, to the second UE, a third message to activate the sidelink BWP switch, for the first UE, to the first sidelink BWP, based at least in part on receiving the second message that confirms the sidelink BWP switch, wherein the third message activates the sidelink BWP switch, for the first UE, to the first sidelink BWP that includes the first sidelink resource pool, and the third message activates a sidelink BWP switch, for the second UE, to a second sidelink BWP that includes a second sidelink resource pool that matches with the first sidelink resource pool.

12. The first UE of claim 11, wherein the one or more processors are further configured to:
switch to the first sidelink BWP after a BWP switching time duration from the third message; and
communicate with the second UE using the first sidelink resource pool in the first sidelink BWP.

13. The first UE of claim 12, wherein, to communicate with the second UE, the one or more processors are configured to:
transmit, to the second UE, a sidelink communication using the first sidelink resource pool in the first sidelink BWP; or
receive, from the second UE, a sidelink communication using the first sidelink resource pool in the first sidelink BWP.

14. The first UE of claim 11, wherein the second message includes an indication of the second sidelink BWP and the second sidelink resource pool in the second sidelink BWP.

15. The first UE of claim 11, wherein the one or more processors, to transmit the first message, are configured to transmit the first message to a plurality of wireless network devices including the second UE, and wherein the one or more processors, to receive the second message, are configured to:

receive, from each of the plurality of wireless network devices, a respective second message that that confirms the sidelink BWP switch for the first UE or does not confirm the sidelink BWP switch for the first UE.

16. The first UE of claim 15, wherein the one or more processors, to transmit the third message, are configured to:
transmit the third message based at least in part on the respective second message, received from at least one wireless network device of the plurality of wireless network devices, confirming the sidelink BWP switch for the first UE.

17. The first UE of claim 15, wherein the plurality of wireless network devices include the second UE and a third UE, wherein the respective second message received from the second UE confirms the sidelink BWP switch for the first UE and the respective second message received from the third UE does not confirm the sidelink BWP switch for the first UE, and wherein the one or more processors, to transmit the third message, are configured to:
transmit the third message based at least in part on a determination that a priority associated with the respective second message received from the second UE is higher than a priority associated with the respective second message received from the third UE.

18. The first UE of claim 11, wherein the third message activates the sidelink BWP switch, for the first UE, to the first sidelink BWP and the sidelink BWP switch, for the second UE, to the second sidelink BWP, after a BWP switching time duration from the third message.

19. The first UE of claim 11, wherein the second message is a physical sidelink feedback channel (PSFCH) message that includes an acknowledgement (ACK) that confirms the sidelink BWP switch for the first UE.

20. The first UE of claim 11, wherein transmitting the first message comprises transmitting the first message to a plurality of UEs including the second UE, and the one or more processors are configured to:
determine whether a respective second message that that confirms the sidelink BWP switch for the first UE or does not confirm the sidelink BWP switch for the first UE is received from each UE of the plurality of UEs within a time duration from transmitting the first message to the plurality of UEs; and
based at least in part on a determination that the respective second message is not received from at least one UE of the plurality of UEs within the time duration from transmitting the first message to the plurality of UEs,
determine that the respective second message from the at least one UE does not approve the BWP switch for the first UE, or
re-transmit the first message to the at least one UE.

\* \* \* \* \*